United States Patent
Kutz et al.

(10) Patent No.: US 12,052,126 B2
(45) Date of Patent: Jul. 30, 2024

(54) MODULATING REFERENCE SIGNALS FOR CONVEYING FEEDBACK INFORMATION

(71) Applicant: QUALCOMM Incorporated, San Diego, CA (US)

(72) Inventors: Gideon Shlomo Kutz, Ramat Hasharon (IL); Tal Oved, Modiin (IL); Assaf Touboul, Netanya (IL)

(73) Assignee: QUALCOMM Incorporated, San Diego, CA (US)

(*) Notice: Subject to any disclaimer, the term of this patent is extended or adjusted under 35 U.S.C. 154(b) by 484 days.

(21) Appl. No.: 17/308,700

(22) Filed: May 5, 2021

(65) Prior Publication Data

US 2022/0360482 A1  Nov. 10, 2022

(51) Int. Cl.
| | |
|---|---|
| *H04L 27/26* | (2006.01) |
| *H04B 7/06* | (2006.01) |
| *H04L 5/00* | (2006.01) |
| *H04W 72/23* | (2023.01) |

(52) U.S. Cl.
CPC ..... *H04L 27/26136* (2021.01); *H04B 7/0619* (2013.01); *H04L 5/0048* (2013.01); *H04L 5/0055* (2013.01); *H04L 27/2605* (2013.01); *H04L 27/2627* (2013.01); *H04L 27/2646* (2013.01); *H04W 72/23* (2023.01)

(58) Field of Classification Search
CPC ........... H04L 27/26136; H04L 27/2605; H04L 5/0055; H04L 27/2646; H04L 5/0048; H04L 27/2627; H04L 23/02; H04L 5/0094; H04L 5/0051; H04L 5/0023; H04L 5/143; H04B 7/0619; H04W 72/23
See application file for complete search history.

(56) References Cited

U.S. PATENT DOCUMENTS

| | | | |
|---|---|---|---|
| 2014/0029589 A1 | 1/2014 | Muharemovic et al. | |
| 2014/0064213 A1* | 3/2014 | Guo | H04L 5/0048 370/329 |
| 2018/0270807 A1* | 9/2018 | Salem | H04W 72/0446 |
| 2018/0367284 A1 | 12/2018 | Huang et al. | |
| 2020/0177416 A1* | 6/2020 | Jiang | H04L 5/10 |

(Continued)

OTHER PUBLICATIONS

International Search Report and Written Opinion—PCT/US2022/023539—ISA/EPO—Jul. 25, 2022.

(Continued)

*Primary Examiner* — Oussama Roudani
(74) *Attorney, Agent, or Firm* — Holland & Hart LLP

(57) ABSTRACT

Methods, systems, and devices for wireless communications are described. In a wireless communications system, a user equipment (UE) and a base station implement reference signal modulation for conveying feedback information. In some examples, the UE may receive, from the base station, control signaling indicating to the UE to convey feedback information by modulating an uplink reference signal. The UE may receive, from the base station, a set of downlink messages. In some cases, the UE may transmit, to the base station, a set of uplink reference signals in response to receiving the downlink messages, where the set of uplink reference signals may be modulated by the UE to convey the feedback information. In some cases, the uplink reference signal may be a sounding reference signal (SRS) with embedded feedback information.

30 Claims, 18 Drawing Sheets

(56) References Cited

U.S. PATENT DOCUMENTS

| | | | |
|---|---|---|---|
| 2021/0112499 A1* | 4/2021 | Takeda | H04W 4/06 |
| 2021/0185706 A1* | 6/2021 | Park | H04J 13/004 |
| 2022/0086824 A1* | 3/2022 | Kundu | H04L 5/0053 |
| 2023/0262710 A1* | 8/2023 | Shin | H04L 5/0053 |

OTHER PUBLICATIONS

Motorola: "Performance of RS Embedded ACK/NACK", 3GPP TSG RAN1#51-Bis, R1-080083, 3rd Generation Partnership Project (3GPP), Mobile Competence Centre, 650, Route Des Lucioles, F-06921 Sophia-Antipolis Cedex, France, vol. RAN WG1, No. Sevilla, Spain, Jan. 14-18, 2008, Jan. 8, 2008, XP050108621, 5 Pages.

* cited by examiner

MODULATING REFERENCE SIGNALS FOR CONVEYING FEEDBACK INFORMATION

FIELD OF TECHNOLOGY

The following relates to wireless communications, including modulating reference signals for conveying feedback information.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). A wireless communications system may support a base station transmitting data to a UE, and the UE conveying feedback to the base station. In some cases, however, techniques for communicating may be deficient.

SUMMARY

The described techniques relate to improved methods, systems, devices, and apparatuses that support modulating reference signals for conveying feedback information. Generally, the described techniques provide for a user equipment (UE) modulating uplink reference signals to convey feedback information to a base station. In some cases, the UE may use uplink signaling for frequent adaptation of a precoding matrix and feedback information (e.g., acknowledgement (ACK) and negative ACK (NACK) feedback). In some cases, the UE may transmit the feedback information to the base station, where the feedback information may include a sounding reference signal (SRS) and feedback information (e.g., ACK/NACK information). In some cases, the UE may modulate the SRS to indicate the feedback information. Additionally or alternatively, the feedback information may be embedded in one or more SRSs (e.g., by applying cyclic shifts). As such, by embedding feedback in the SRS waveform on the uplink, the UE may transmit feedback information to the base station without using additional time-frequency resources, and the base station may adapt (e.g., calculate) the precoding matrix based on receiving the SRS and the embedded feedback.

A method for wireless communication at a user equipment (UE) is described. The method may include receiving, from a base station, control signaling indicating to the UE to convey feedback information by modulating an uplink reference signal, receiving, from the base station, a set of downlink messages, and transmitting, to the base station, a set of uplink reference signals in response to receiving the set of downlink messages, where the set of uplink reference signals are modulated by the UE to convey the feedback information for the set of downlink messages according to the control signaling.

An apparatus for wireless communication at a UE is described. The apparatus may include a processor, memory coupled with the processor, and instructions stored in the memory. The instructions may be executable by the processor to cause the apparatus to receive, from a base station, control signaling indicating to the UE to convey feedback information by modulating an uplink reference signal, receive, from the base station, a set of downlink messages, and transmit, to the base station, a set of uplink reference signals in response to receiving the set of downlink messages, where the set of uplink reference signals are modulated by the UE to convey the feedback information for the set of downlink messages according to the control signaling.

Another apparatus for wireless communication at a UE is described. The apparatus may include means for receiving, from a base station, control signaling indicating to the UE to convey feedback information by modulating an uplink reference signal, means for receiving, from the base station, a set of downlink messages, and means for transmitting, to the base station, a set of uplink reference signals in response to receiving the set of downlink messages, where the set of uplink reference signals are modulated by the UE to convey the feedback information for the set of downlink messages according to the control signaling.

A non-transitory computer-readable medium storing code for wireless communication at a UE is described. The code may include instructions executable by a processor to receive, from a base station, control signaling indicating to the UE to convey feedback information by modulating an uplink reference signal, receive, from the base station, a set of downlink messages, and transmit, to the base station, a set of uplink reference signals in response to receiving the set of downlink messages, where the set of uplink reference signals are modulated by the UE to convey the feedback information for the set of downlink messages according to the control signaling.

Some examples of the method, apparatuses, and non-transitory computer-readable medium described herein may further include operations, features, means, or instructions for applying a modulation configuration to the set of uplink reference signals, where conveying the feedback information may be based on applying the modulation configuration.

In some examples of the method, apparatuses, and non-transitory computer-readable medium described herein, applying the modulation configuration may include operations, features, means, or instructions for applying one or more first cyclic shifts from a set of cyclic shifts to a first uplink reference signal of the set of uplink reference signals and applying one or more second cyclic shifts from the set of cyclic shifts to a second uplink reference signal of the set of uplink reference signals, where the one or more first cyclic shifts and the one or more second cyclic shifts indicate one or more of an ACK feedback, a NACK feedback, supplemental feedback information, or a combination thereof.

In some examples of the method, apparatuses, and non-transitory computer-readable medium described herein, applying the modulation configuration may include operations, features, means, or instructions for modulating each uplink reference signal of the set of uplink reference signals by using a sequence of pilot tones from a set of sequences of pilot tones.

Some examples of the method, apparatuses, and non-transitory computer-readable medium described herein may further include operations, features, means, or instructions for identifying a set of antenna ports to convey the feedback information for the set of downlink messages based on the control signaling, where transmitting the set of uplink reference signals includes transmitting the set of uplink reference signals on the set of antenna ports.

In some examples of the method, apparatuses, and non-transitory computer-readable medium described herein, the set of antenna ports may be at least one of time division multiplexed (TDM-ed), frequency division multiplexed (FDM-ed), code division multiplexed (CDM-ed), or a combination thereof.

In some examples of the method, apparatuses, and non-transitory computer-readable medium described herein, the set of antenna ports may be equal to a number of precoded downlink antenna ports. In some examples of the method, apparatuses, and non-transitory computer-readable medium described herein, the feedback information may be repeated on at least two antenna ports from the set of antenna ports.

Some examples of the method, apparatuses, and non-transitory computer-readable medium described herein may further include operations, features, means, or instructions for transmitting, to the base station, a capability of the UE to support conveying of the feedback information for the set of downlink messages according to the control signaling, where receiving the control signaling may be based on the transmitted capability.

Some examples of the method, apparatuses, and non-transitory computer-readable medium described herein may further include operations, features, means, or instructions for identifying a feedback delay parameter based on the control signaling, where transmitting the set of uplink reference signals includes transmitting the set of uplink reference signals based on the feedback delay parameter. In some examples of the method, apparatuses, and non-transitory computer-readable medium described herein, the feedback delay parameter may be based on a frequency of conveying the feedback information or a UE capability or both.

Some examples of the method, apparatuses, and non-transitory computer-readable medium described herein may further include operations, features, means, or instructions for determining that a decoding procedure of a subset of the set of downlink messages may be unsuccessful, where transmitting the set of uplink reference signals includes transmitting a NACK feedback for the set of downlink messages based on the subset of downlink messages satisfying a threshold.

In some examples of the method, apparatuses, and non-transitory computer-readable medium described herein, the control signaling indicates at least one of a slot number, a frame number, a symbol number, a cell identifier, a UE identifier, or a combination thereof.

In some examples of the method, apparatuses, and non-transitory computer-readable medium described herein, transmitting the set of uplink reference signals may include operations, features, means, or instructions for transmitting the set of uplink reference signals in a full duplex mode of communication. In some examples of the method, apparatuses, and non-transitory computer-readable medium described herein, the set of uplink reference signals includes a set of SRSs.

A method for wireless communication at a base station is described. The method may include transmitting, to a UE, control signaling indicating to the UE to convey feedback information by modulating an uplink reference signal, transmitting, to the UE, a set of downlink messages, and receiving, from the UE, a set of uplink reference signals in response to receiving the set of downlink messages, where the set of uplink reference signals are modulated by the UE to convey the feedback information for the set of downlink messages according to the control signaling.

An apparatus for wireless communication at a base station is described. The apparatus may include a processor, memory coupled with the processor, and instructions stored in the memory. The instructions may be executable by the processor to cause the apparatus to transmit, to a UE, control signaling indicating to the UE to convey feedback information by modulating an uplink reference signal, transmit, to the UE, a set of downlink messages, and receive, from the UE, a set of uplink reference signals in response to receiving the set of downlink messages, where the set of uplink reference signals are modulated by the UE to convey the feedback information for the set of downlink messages according to the control signaling.

Another apparatus for wireless communication at a base station is described. The apparatus may include means for transmitting, to a UE, control signaling indicating to the UE to convey feedback information by modulating an uplink reference signal, means for transmitting, to the UE, a set of downlink messages, and means for receiving, from the UE, a set of uplink reference signals in response to receiving the set of downlink messages, where the set of uplink reference signals are modulated by the UE to convey the feedback information for the set of downlink messages according to the control signaling.

A non-transitory computer-readable medium storing code for wireless communication at a base station is described. The code may include instructions executable by a processor to transmit, to a UE, control signaling indicating to the UE to convey feedback information by modulating an uplink reference signal, transmit, to the UE, a set of downlink messages, and receive, from the UE, a set of uplink reference signals in response to receiving the set of downlink messages, where the set of uplink reference signals are modulated by the UE to convey the feedback information for the set of downlink messages according to the control signaling.

Some examples of the method, apparatuses, and non-transitory computer-readable medium described herein may further include operations, features, means, or instructions for identifying a modulation configuration applied to the set of uplink reference signals, where conveying the feedback information may be based on the modulation configuration applied to the set of uplink reference signals.

In some examples of the method, apparatuses, and non-transitory computer-readable medium described herein, identifying the modulation configuration may include operations, features, means, or instructions for identifying one or more first cyclic shifts from a set of cyclic shifts applied to a first uplink reference signal of the set of uplink reference signals and identifying one or more second cyclic shifts from the set of cyclic shifts applied to a second uplink reference signal of the set of uplink reference signals, where the one or more first cyclic shifts and the one or more second cyclic shifts indicate one or more of an ACK feedback, a NACK feedback, supplemental feedback information, or a combination thereof.

Some examples of the method, apparatuses, and non-transitory computer-readable medium described herein may further include operations, features, means, or instructions for applying a hypothesis test on the first uplink reference signal of the set of uplink reference signals and the second uplink reference signal of the set of uplink reference signals to identify one or more of the ACK feedback, NACK feedback, the supplemental feedback information, or a combination thereof.

In some examples of the method, apparatuses, and non-transitory computer-readable medium described herein, identifying the modulation configuration may include operations, features, means, or instructions for identifying that each uplink reference signal of the set of uplink reference signals may be modulated using a sequence of pilot tones from a set of sequences of pilot tones.

Some examples of the method, apparatuses, and non-transitory computer-readable medium described herein may further include operations, features, means, or instructions for identifying a set of antenna ports to convey the feedback information for the set of downlink messages based on the control signaling, where receiving the set of uplink reference signals includes receiving the set of uplink reference signals on the set of antenna ports.

In some examples of the method, apparatuses, and non-transitory computer-readable medium described herein, the set of antenna ports may be at least one of TDM-ed, FDM-ed, CDM-ed, or a combination thereof. Some examples of the method, apparatuses, and non-transitory computer-readable medium described herein may further include operations, features, means, or instructions for receiving, from the UE, a capability of the UE to support conveying of the feedback information for the set of downlink messages according to the control signaling, where transmitting the control signaling may be based on the received capability.

Some examples of the method, apparatuses, and non-transitory computer-readable medium described herein may further include operations, features, means, or instructions for identifying a feedback delay parameter based on the control signaling, where receiving the set of uplink reference signals includes receiving the set of uplink reference signals based on the feedback delay parameter. In some examples of the method, apparatuses, and non-transitory computer-readable medium described herein, the feedback delay parameter may be based on a frequency of conveying the feedback information or a UE capability or both.

DETAILED DESCRIPTION

Figure 1:
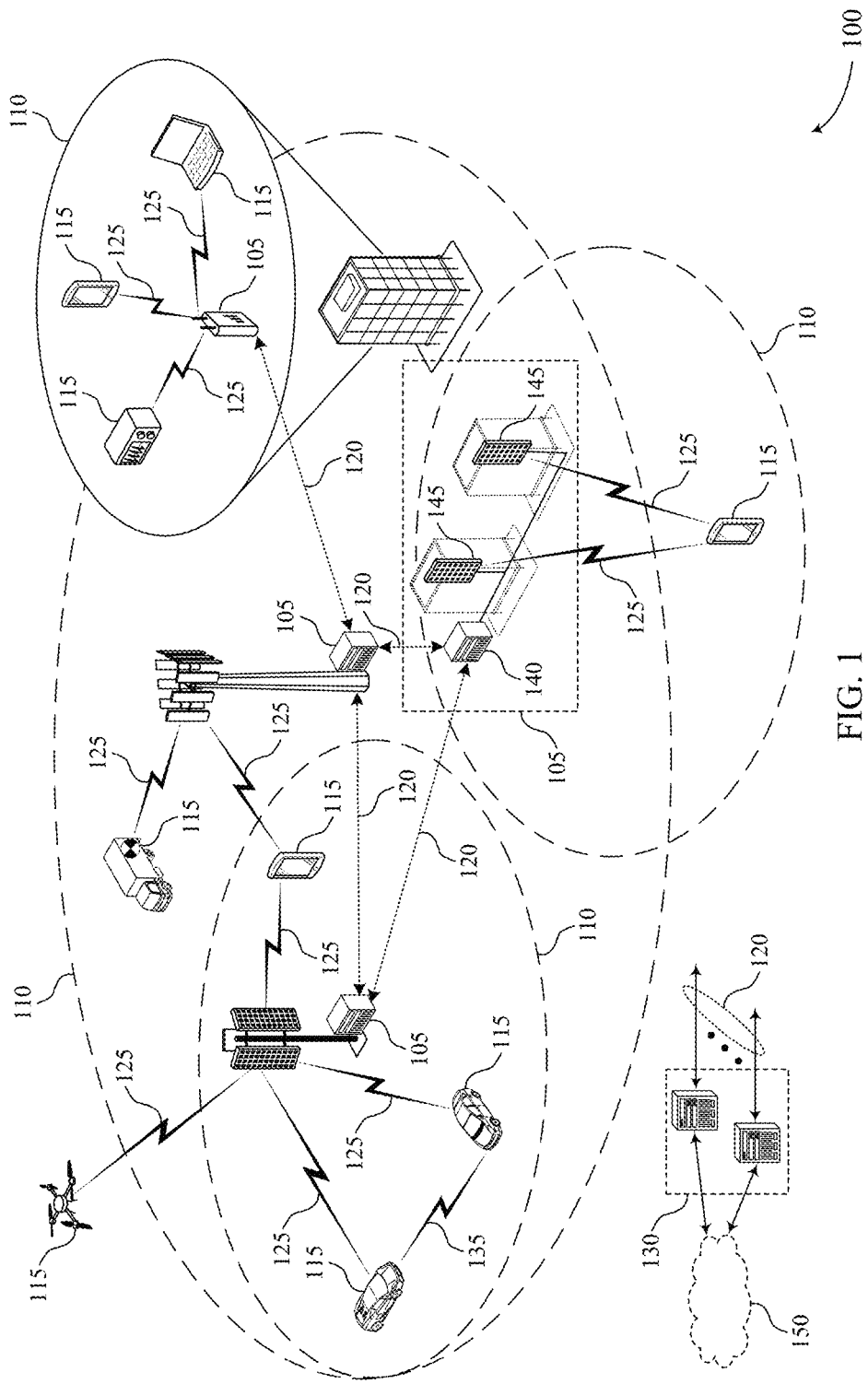
FIG. 1 illustrates an example of a wireless communications system that supports modulating reference signals for conveying feedback information in accordance with aspects of the present disclosure.

In some wireless communications systems, a base station may transmit data (e.g., to a user equipment (UE)) using a coding rate determined based on channel conditions and interference at a given time. In some cases, the base station may implement a rate adaptation process to change the coding rate, where the base station may transmit a channel state information (CSI) reference signal (CSI-RS) to the UE, and the UE may estimate the coding rate that the base station may use to transmit to the UE based on the CSI-RS. However, the coding rate may remain constant until the UE receives a new CSI-RS signal, which may be an inefficient use of resources as the channel conditions may vary between CSI-RS signals. Additionally or alternatively, transmitting CSI-RS signals constantly may introduce high signaling overhead.

In some cases, the base station may implement a modulation and coding rate adaptation scheme by using repetitive retransmissions. The base station may transmit a first transmission with a high coding rate. If the first transmission fails (e.g., if the UE is unable to decode the first transmission), the base station may retransmit small number of bits. Retransmitting a small set of bits may result in a lower coding rate, and in some cases, the base station may repeat the process until the UE is able to successfully decode the transmission. However, retransmitting small sets of bits based on the ACK/NACK messages from the UE may include a large amount of feedback.

Techniques described herein support a feedback conveying mechanism by modulating reference signals. A UE may modulate uplink reference signals to convey feedback information to the base station. In some cases, the UE may use uplink signaling for frequent adaptation of a precoding matrix and feedback information (e.g., acknowledgement (ACK) and negative ACK (NACK) feedback). In some cases, the UE may transmit feedback information to the base station. For example, the feedback information may include a sounding reference signal (SRS) and feedback information. In some cases, the UE may modulate the SRS to indicate the feedback information (e.g., ACK/NACK information). Additionally or alternatively, the feedback information may be embedded in one or more SRSs (e.g., using cyclic shifts). As such, by embedding the feedback in the SRS waveform on the uplink, the UE may adapt the PMI and may transmit the feedback information to the base station without using additional time-frequency resources.

Aspects of the present disclosure may be implemented to realize one or more of the following advantages. The present disclosure may support improved feedback transmission by a UE. For example, the present disclosure may enable a UE to convey feedback by modulation SRSs which may result in decreased latency and improved reliability, among other benefits. The present disclosure may also enable a UE to more efficiently use a frequency spectrum as feedback information is embedded in an SRS signal without additional frequency or time resources.

Aspects of the disclosure are initially described in the context of wireless communications systems. Aspects of the disclosure are then illustrated by and described with reference to resource diagrams and reference signal configurations. Aspects of the disclosure are further illustrated by and described with reference to apparatus diagrams, system diagrams, and flowcharts that relate to modulating reference signals for conveying feedback information.

FIG. 1 illustrates an example of a wireless communications system 100 that supports modulating reference signals for conveying feedback information in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS, which may be precoded or unprecoded. The UE 115 may provide feedback for beam selection, which may be a PMI or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems, the base station 105 may transmit data (e.g., to a UE 115) using a coding rate determined based on channel conditions, including channel interference, at a given point in time. In some cases, the base station 105 may implement a rate adaptation process to change the coding rate, where the base station 105 may transmit a CSI-RS to the UE 115, and the UE 115 may estimate the coding rate that the base station 105 may use to transmit to the UE 115 based on the CSI-RS. In some cases, current CSI-RS based channel capacity tracking schemes may not adapt to the instantaneous MCS (e.g., an MCS that may be decoded successfully on a specific TTI). For example, some wireless communications methods may underutilize the full available channel capacity. In some examples, the coding rate may remain constant until a new CSI-RS signal is received by the UE 115, which may be an inefficient use of resources as the channel conditions may vary between CSI-RS signals. Additionally or alternatively, transmitting CSI-RS signals constantly may introduce high signaling overhead. In some cases, CSI-RS channel estimation may inaccurately measure the performance of a receiver. Additionally, a channel state may be sampled at a discrete time (e.g., CSI-RS slots), even if in low velocities, the MCS (and coding rate) may change between those slots.

In some cases, the applied MCS, and more specifically the applied coding rate, may be based on a first transmission, and the base station 105 may lack the ability to dynamically adapt the coding rate. In some examples, if the first transmission fails, the base station 105 may retransmit approximately the same number of coded bits. In some retransmission schemes, the base station 105 may use a small set of redundancy versions (RVs) to transmit the bits (e.g., retransmission of the bits). The bits may be the same bits as in the first transmission (e.g., Chase combining), which may result in the same coding rate. In some cases, the selected bits may be new coded bits (e.g., incremental redundancy), which may result in halving the effective coding rate in the second retransmission. As a result, it may be beneficial to estimate the coding rate on the first transmission. In some cases, overestimating the coding rate may result in decoding errors which may lead to throughput loss. On the other hand, underestimating the coding rate may result in a loss of throughput as a larger payload may have been transmitted over the same channel resource. In some cases, link adaptation between CSI-RS slots may be performed using an outer loop link adaptation (OLLA) scheme. However, the base station 105 may lack the ability to track MCS changes accurately using the OLLA scheme.

In some examples, the base station 105 may use a multi incremental redundancy scheme (MIRS) for rate adaptation. MIRS may achieve results close to that of a threshold MCS selection and achieve communications at a capacity code rate regardless of mobility (e.g., of a UE 115). In some cases, MIRS may be utilized if there is an overestimated coding rate (e.g., to ensure throughput is not lost due to an underestimated coding rate). The base station 105 may rely on extensive usage of small-sized retransmissions (e.g., of incremental redundancy (IR) HARQ (IR-HARQ) for fine, dynamic adaptation of the coding rate based on the ACK/NACK feedback from the receiving device (e.g., the UE). That is, each time the receiver sends a NACK, or alternatively, each time the receiver does not send an ACK, the small number of additional redundancy bits may be transmitted. The UE 115 may also use per code block (CB) feedback to further maximize channel utilization.

In some cases, the base station 105 may utilize MIRS following a communications process. On a first transmission, the base station 105 (e.g., a transmitter) may select a threshold MCS that may be expected to fail in a number of examples. The selection may indicate the coding parameters, such as the coding rate and a transport block size (TBS), among others, for all of the following retransmissions. In some cases, for each decoding failure, the receiver (e.g., a UE 115) may transmit feedback to the base station 105 including per-CB decoding results. Additionally or alternatively, the UE 115 may convey additional information to allow the base station 105 faster convergency on the actual rate. In some cases, for each decoding failure, the base station 105 may schedule and send additional bits for each failing transport block (TB) (and optionally for each failing CB) from the initial buffered coded bits of the CBs. The added bits in each retransmission may be used to reduce the effective coding rate of each CB in fine steps until all CBs, and consequently the whole TB, are successfully decoded. In some cases, the total number of bits sent over the first and subsequent transmissions may determine the coding rate used for each TB.

In some cases, in addition to MIRS rate adaptation, the base station 105 may use tight PMI adaptation which may result in an additional gain (e.g., up to 2 dB) based on a channel reciprocity assumption. In some cases, the UE 115 may transmit frequent and fast ACK/NACK feedback to the base station 105 to minimize the associated latency involved in the multiple retransmissions of MIRS, which may be advantageous if the feedback is sent every symbol or every small group of symbols.

In some cases, the UE 115 may modulate uplink reference signals to convey feedback information to the base station 105. In some cases, the UE 115 may use uplink signaling for frequent adaptation of a precoding matrix and feedback information (e.g., ACK/NACK feedback). In some cases, the UE 115 may transmit feedback information to the base station 105, where the feedback information may include an SRS and feedback information. In some cases, the UE may modulate the SRS to indicate the feedback information. Additionally or alternatively, the feedback information may be embedded in one or more SRSs (e.g., using cyclic shifts). As such, by embedding the feedback in the SRS waveform on the uplink, the UE may send the feedback information to the base station without using additional time and frequency resources, and the base station may adapt (e.g., calculate) the precoding matrix based on receiving the SRS and the embedded feedback.

Figure 2:
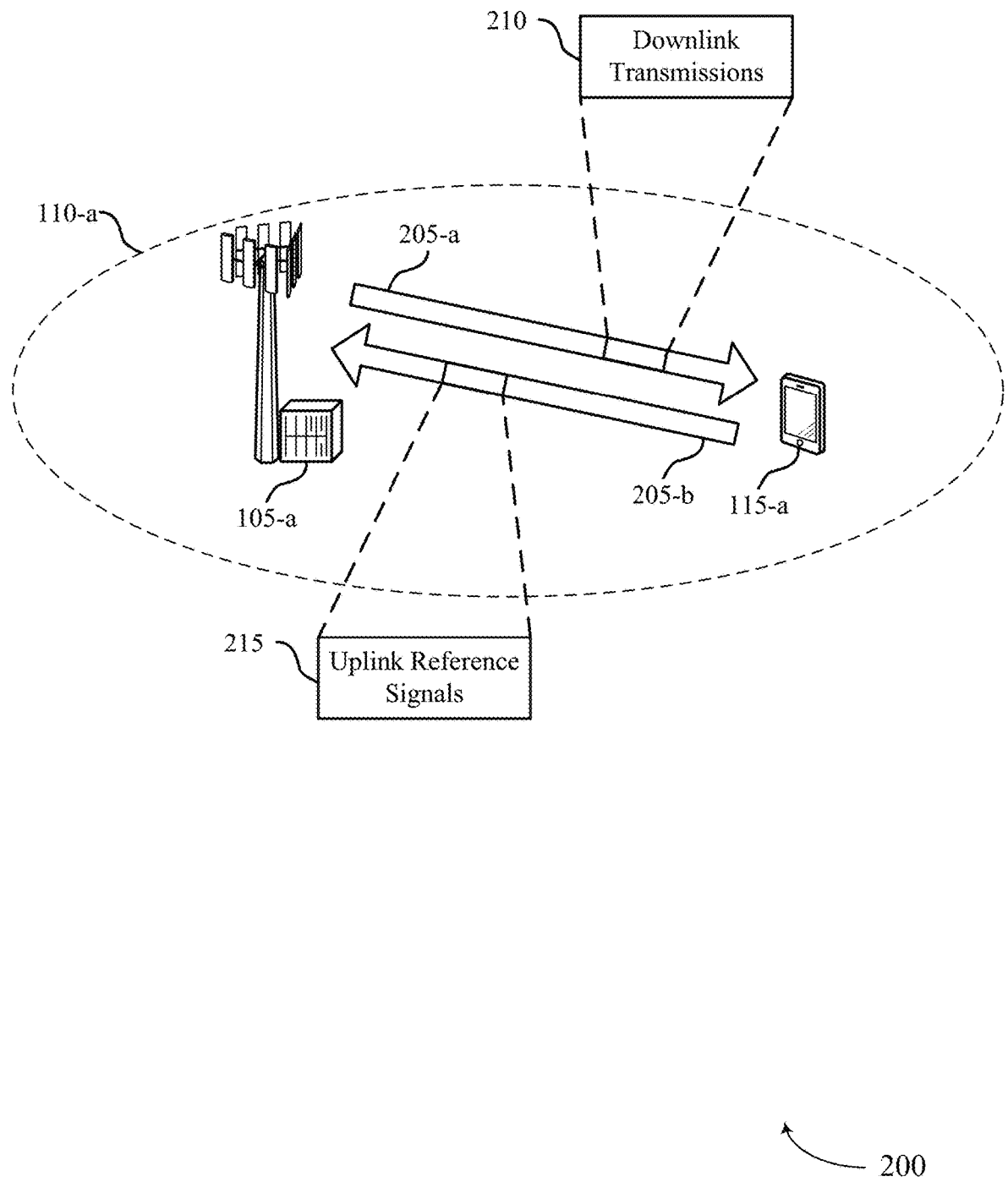
FIG. 2 illustrates an example of a wireless communications system that supports modulating reference signals for conveying feedback information in accordance with aspects of the present disclosure.

FIG. 2 illustrates an example of a wireless communications system 200 that supports modulating reference signals for conveying feedback information in accordance with aspects of the present disclosure. In some examples, the wireless communications system 200 may implement or be implemented by aspects of the wireless communications system 100. For example, the wireless communications system 200 may include a UE 115-a and a base station 105-a, which may be examples of a UE 115 and a base station 105 as described with reference to FIG. 1.

The UE 115-a may communicate with the base station 105-a in a geographic coverage area 110-a supported by the base station 105-a. The geographic coverage area 110-a which may be an example of a geographic coverage area 110 as described with reference to FIG. 1. As depicted in the example of FIG. 1, the base station 105-a may transmit one or more downlink signals to the UE 115-a via a communications link 205-a (e.g., a downlink communications link) and the UE 115-a may transmit one or more uplink signals to the base station 105-a via a communications link 205-b (e.g., an uplink communications link). In some cases, the UE 115-a may be configured by the base station 105-a to transmit feedback to the base station 105-a using a modulated uplink SRS. In some cases, the base station 105-a may transmit a set of downlink transmissions 210 via the communications link 205-a, where the downlink transmissions 210 may include code block groups (CBGs) in TBs. In response to receiving the downlink transmissions 210, the UE 115-a may transmit a set of uplink reference signals 215 (e.g., SRSs) to the base station 105-a. In some case, the uplink reference signals 215 may contain embedded feedback information (e.g., ACK/NACK feedback) for the CBGs on TBs received by the UE 115-a.

In some cases, to use the uplink reference signals 215 for precoding, the UE 115-a may transmit the uplink reference signals 215 on multiple antenna ports such that the downlink precoding matrix may be calculated and updated based on a reciprocity assumption. In some cases, the antenna ports may be TDM-ed, FDM-ed, code division multiplexed (CDM-ed), or any combination thereof. For example, the UE 115-a may identify a set of antenna ports to convey the feedback information for the set of downlink transmissions 210 based on receiving control signaling from the base station 105-a. In some examples, transmitting the set of uplink reference signals 215 may include transmitting the set of uplink reference signals 215 on the set of antenna ports. The set of antenna ports may be equal to a number of precoded downlink antenna ports. Additionally or alternatively, feedback information may be repeated on at least two antenna ports from the set of antenna ports. In some cases, an uplink reference signal 215 may be transmitted per symbol or small groups of symbols, which may allow for tight and frequent precoding tracking (e.g., a roughly 2 dB performance gain versus PMI per CSI-RS event). In some cases, the SRS may be transmitted in a full duplex mode as a narrowband uplink signal. In some cases, the feedback information (e.g., ACK/NACK information) may be embedded in the SRS using for example, cyclic shifts.

In some cases, MIRS rate adaptation may allow the base station 105-a and the UE 115-a to adapt the coding rate. In some cases, the UE 115-a may also adapt the precoding that the base station 105-a may use to transmit data to the UE 115-a. Like a coding rate, the precoding may also change frequently depending on channel conditions and interference. As such, the UE 115-a may transmit the uplink reference signals 215 so that, based on a reciprocity assumption (e.g., that the uplink channel and the downlink channel appear the same), the base station 105-a may receive and determine (e.g., based on internal calculations) a precoding for transmissions. If the uplink reference signal 215 is transmitted every symbol or small group of symbols, the base station 105-a may be able to rapidly adapt the precoding. In some cases, the UE 115-a may use the uplink reference signals 215 to adapt the precoding and to send feedback information.

In some cases, the UE 115-a and the base station 105-a may support a full duplex communications scheme, where a downlink allocation for transmitting MIRS information (e.g., CBs and TBs) may be relatively wide (e.g., 100 MHz or more), and where an uplink allocation for transmitting the uplink SRS for the precoding matrix and ACK/NACK feedback may be relatively narrow (e.g., 2 RBs). In some cases, the uplink allocation may be narrow and may not interfere with downlink transmissions. For example, using the same antenna, the UE 115-a may receive downlink information and transmit feedback to the base station 105-a simultaneously utilizing the same frequency resources. In some cases, the UE 115-a and the base station 105-a may support a TDD scheme, an FDD scheme, or another type of duplex scheme.

In some examples, the UE 115-a may utilize a feedback delay which may be a number of symbols (e.g., d symbols). For instance, the UE 115-a may identify a feedback delay parameter based on receiving a control signaling from the base station 105-a. In some examples, transmitting the set of uplink reference signals 215 may include transmitting the set of uplink reference signals 215 based on the feedback delay parameter. In some cases, the delay may be fixed or may be indicated by a UE capability. That is, the feedback delay parameter may be based on a frequency of conveying the feedback information or a UE capability or both. Additionally or alternatively, the delay may vary based on the requested feedback information per symbol. For example, received symbols associated with a large feedback may be split into consecutive symbols in the feedback.

In some cases, the UE 115-a may utilize rank and sounding signal layer multiplexing. In some cases, the number of antenna ports may be identical to the number of receive antennas to enable channel matrix estimation assuming reciprocity. In some cases, the antenna ports may be TDM-ed, FDM-ed, or CDM-ed, or any combination thereof. Additionally or alternatively, the number of sounding antenna ports may also be reported in downlink control information (DCI) or implicitly determined from the downlink rank or from the number of receive antennas.

In some examples, the UE 115-a may embed the feedback information (e.g., ACK/NACK information) into the uplink reference signals 215. In some cases, the UE 115-a may use a compression scheme to embed the feedback information (e.g., ACK/NACK information), and in some cases, the compression scheme may be lossless or lossy. The compression scheme may also be based on network coding or a type of compression (e.g., Huffman code). In some cases, the UE 115-a may use a partial feedback method. In some examples, for each TB, the UE 115-a may transmit particular waveforms to signal failures of less than a threshold number (e.g., x) of CBGs. If there are more than the threshold number of failed CBGs, the UE 115-a may signal a NACK to the base station 105-a (e.g., if more than x CBGs failed, the UE 115-a may signal that all of the CBGs failed). For example, the UE 115-a may determine that a decoding procedure of a subset of the set of downlink messages is unsuccessful. The UE 115-a may transmit a NACK feedback for the set of downlink transmissions 210 based on the subset of downlink messages satisfying a threshold. In some cases, the value of the selective retransmissions may be small, which may allow for further compression of the feedback information. In some cases, the UE 115-a may determine to transmit partial feedback. For example, the UE 115-a may transmit partial feedback if some of the TBs may be in a third retransmission and some other TBs may be in a first retransmission. As such, if all of the CBs in the TBs in the third retransmission failed, then the UE 115-a may refrain from sending feedback for the TBs in the first retransmission as the UE 115-a may assume all of the CBs in the TBs in the first retransmission will also fail in the third retransmission of that TB.

In some cases, the UE 115-a may also transmit the feedback information (e.g., ACK/NACK information) by modulating the uplink reference signals 215 in various ways. In some examples, each feedback waveform may signal a different sequence of pilots (e.g., tabulated) which may be tabulated (e.g., by index). In some cases, the requested feedback may include additional parameters such as a slot number, a frame number, a symbol number, a cell identifier, or a UE identifier, among other parameters. For example, the base station 105-a may transmit a control signaling to the UE 115-a. The control signaling may indicate at least one of a slot number, a frame number, a symbol number, a cell identifier, a UE identifier, or a combination thereof. In addition to the feedback information, the UE 115-a may also embed other related information into the uplink reference signals 215 such as a gap to a passing CB (e.g., how much redundancy may be added such that a CB may be successfully decoded and quantized to a basic quantity).

Figure 3:
FIG. 3 illustrates an example of a resource configuration that supports modulating reference signals for conveying feedback information in accordance with aspects of the present disclosure.

FIG. 3 illustrates an example of a resource configuration 300 that supports modulating reference signals for conveying feedback information in accordance with aspects of the present disclosure. In some examples, the resource configuration 300 may implement or be implemented by aspects of wireless communications system 100, for example a UE 115 and a base station 105 as described with reference to FIGS. 1 and 2. In some examples, the resource configuration 300 may represent a resource configuration for MIRS rate adaptation or a different type of rate adaptation scheme.

Using a rate adaptation scheme (e.g., MIRS), the UE 115 may transmit feedback to the base station 105 on a number of CBGs per symbol if the size of the CBGs used for retransmissions are small. For example, the UE 115 may receive a set of four CBGs, where each CBG may include two CBs. The set of CBGs may include CBG0, CBG1, CBG2 and CBG3. CBG0 may include CB0 and CB1, CBG1 may include CB2 and CB3, CBG2 may include CB4 and CB5, and CBG3 may include CB6 and CB7. In some cases, the UE 115 may use a set of time-frequency resources 310, which may include multiple TBs 305. For example, the time-frequency resources 310 may include a TB0 305-*a*, a TB1 305-*b*, a TB2 305-*c*, a TB3 305-*d*, a TB4 305-*e*, and a TB5 305-*f*. In some cases, each TB 305 may include one or more CBs. For example, the TB0 305-*a* may include a CB0, a CB2, a CB3, a CB4, a CB5, and a CB7. In some cases, the time-frequency resources 335 may be represented by a symbol (e.g., in time) and an RB (e.g., in frequency). In some cases, there may be more CBs and CBGs that are not shown in the example time-frequency resources 310 (e.g., some CBs may have already been decoded in previous slots).

In some cases, the base station 105 may transmit a small number of bits per retransmission, and as such, the TB 305 may span a portion of a resource allocation. For example, the TB0 305-*a* may not occupy the entire resource allocation it may be allocated in, and the base station 105 may use the remaining portion of the resource allocation to transmit another TB 305, such as the TB1 305-*b*. In some cases, the TB1 305-*b* may include a number of CBs which may take up a full resource allocation or a portion of a resource allocation. For a CB6 and a CB7 in the TB1 305-*a*, the base station 105 may use the remaining allocation to transmit another TB 305, such as TB2 305-*a*. The base station 105 may repeat this process for all TBs 305, allowing multiple different TBs 305 to be transmitted in the same slot. In some cases, for example, TB5 305-*f* may be in its first retransmission (e.g., RV0) and may be larger in size than a different TB 305, such as the TB0 305-*a*, for example, which may be in its 7th retransmission (e.g., RB6) and therefore may be smaller in size. It is to be understood that each TB 305 may also have an RV (e.g., one retransmission, two retransmissions, and so on).

In some examples, the resource configuration 300 may result in the UE 115 receiving a number of different TBs 305, each with a different number of retransmissions. In some cases, the UE 115 may transmit feedback to the base station 105 per TB 305 and per CB, which may include transmitting a large number of feedback bits (e.g., ACK/NACK bits) per slot. As such, the UE 115 may benefit from using a waveform that encodes the feedback data. In some cases, the techniques described with reference to MIRS rate adaptation may also be applied to other processes (e.g., in 5G) in which a UE 115 may send feedback information per CB or per CBG.

In some cases using MIRS, the UE 115 may use an uplink sounding signal 315 (e.g., an SRS) to send a feedback indication 320 (e.g., ACK/NACK feedback) to the base station 105. In some examples, the UE 115 may transmit the sounding signal 315 using four antenna ports, as described with reference to FIG. 4. For example, the UE 115 may transmit a sounding signal 315 for antenna 1 and antenna 2 on the first time period (e.g., symbol) and for antenna 3 and antenna 4 on the second time period, and so on, such that signals from all four antennas may be sent every two symbols (e.g., signals using antenna 1 and antenna 2 may be sent on odd symbols and signals using antenna 3 and antenna 4 may be sent on even symbols).

In some cases, each set of uplink signals in the sounding signal 315 (e.g., SRS) may be modulated using a number of cyclic shifts. For example, a first cyclic shift of a first sounding signal 315 may indicate a combination of feedback information (e.g., ACK/NACK feedback) for a first set of CBs (e.g., the CBs in TB0 305-*a*), and a second cyclic shift on a second sounding signal 315 (e.g., SRS) may indicate a combination of feedback information (e.g., ACK/NACK feedback) for a second set of CBs (e.g., the CBs in the TB1 305-*b*). In some examples, the first cyclic shift and the second shift may indicate the feedback information (e.g., ACK/NACK feedback) for the first set of CBs. Additionally or alternatively, the indicated feedback may be other types of feedback (e.g., in addition to the ACK/NACK feedback). In some cases, for every symbol, the UE 115 may cyclically shift the sounding signal 315 to modulate (e.g., embed) the feedback information (e.g., ACK/NACK information). For example, the UE 115 may use a 3-symbol delay for transmitting the ACK/NACK indication to the base station 105. The UE 115 may transmit the sounding signal 315 modulated to indicate feedback for the TB0 305-*a* and the TB1 305-*b* (e.g., and the corresponding CBGs in each TB 305) in the fourth and fifth symbols using the four antenna ports, where the TB0 305-*a* and the TB1 305-*b* may be received in the first and second symbols of the set of time-frequency resources 310. In some cases, the TB 305 may not complete in a symbol (e.g., the TB2 305-*c*) and as such, the corresponding sounding signal symbol (e.g., the sixth symbol) may not include a feedback indication 320. In some cases where feedback for more than four CBGs is transmitted in the same symbol, the feedback information may span more than one symbol. For example, the feedback indication 320 for the TB2 305-*c* and the TB3 305-*d* may span two symbols (e.g., the seventh and eight symbols of the sounding signal 315). In some cases, the feedback for the TB5 305-*e*may be sent in the next allocated slot. Additionally or alternatively, feedback may be sent in between the TBs 305 using other available resources.

Figure 4:
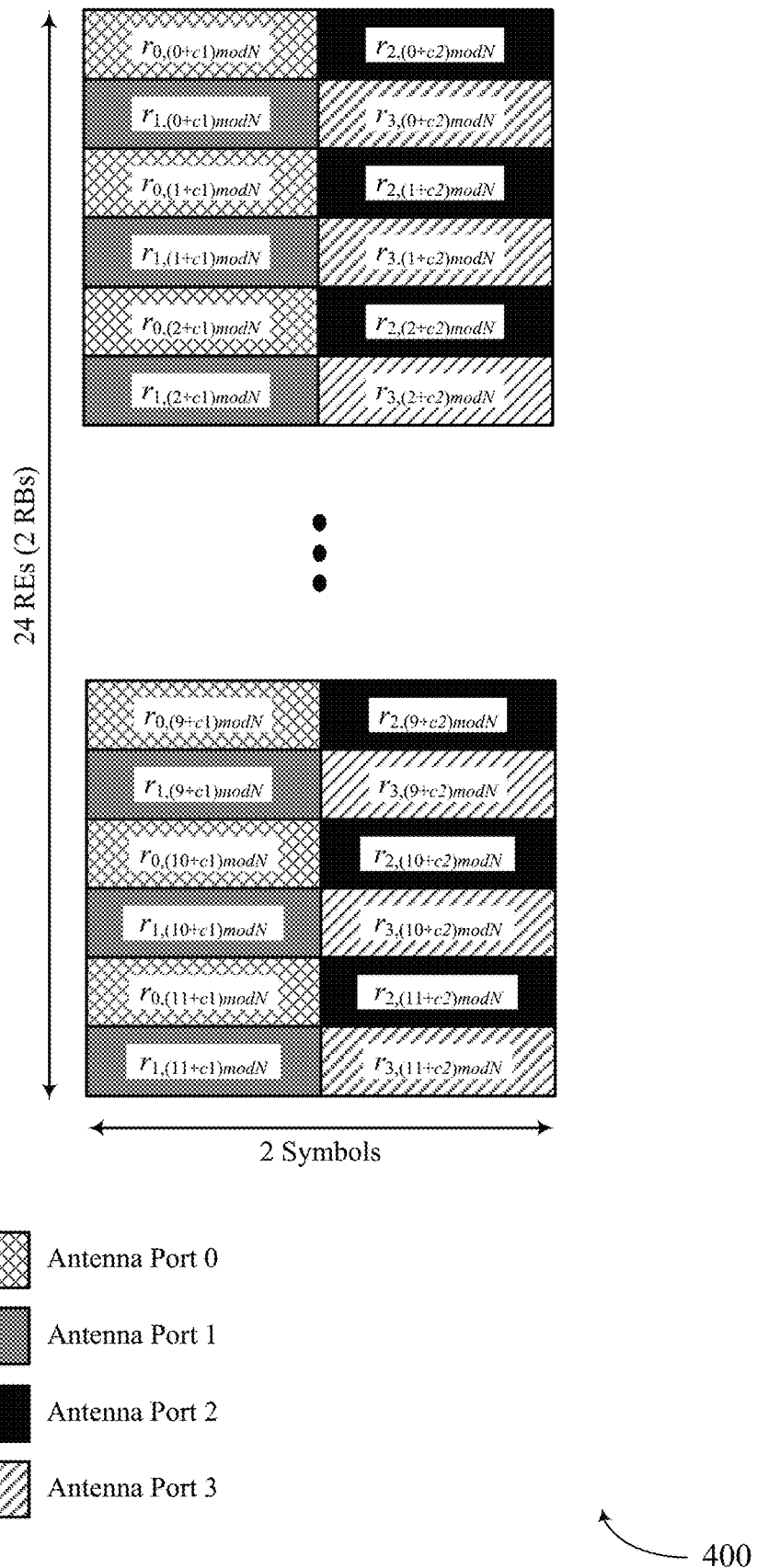
FIG. 4 illustrates an example of a sounding signal configuration that supports modulating reference signals for conveying feedback information in accordance with aspects of the present disclosure.

FIG. 4 illustrates an example of a sounding signal configuration 400 that supports modulating reference signals for conveying feedback information in accordance with aspects of the present disclosure. In some examples, the sounding signal configuration 400 may implement or be implemented by aspects of wireless communications system 100, for example a UE 115 and a base station 105 as described with reference to FIGS. 1 and 2.

As depicted herein, the uplink SRS may span two RBs (e.g., 24 REs) in the frequency domain and two symbols in the time domain. In some cases, the UE 115 may transmit the SRS using four antenna ports 405, which may be used for four layers for four receive antenna reception. In some cases, the transmitted sequence (e.g., the signal waveform) per RE may be described according to Equation 1:

$$r_{p,(n+c_x) \bmod N} \quad (1)$$

where p may represent the port number (e.g., 0, 1, 2, 3), $c_x \in \{0, 2, 4, 6, 8, 10, 11\}$ may represent the number of cyclic shifts to compress ACK/NACK information in the SRS, n=0, 1, . . . N−1, and N may represent the sequence length (e.g., 12). In some cases, the four antenna ports 405 may be used for four layers (e.g., reception at four receive antennas), where two antenna ports 405 may be FDM-ed on even numbered symbols and the other two antenna ports 405 may be FDM-ed on odd numbered symbols. For example, an antenna port 0 405-*a* and an antenna port 1 405-*b* may be used to transmit SRS on a first symbol, the antenna port 0 405-*a* used on the odd REs and the antenna port 1 405-*b* used on the even REs, and an antenna port 2 405-*c* and an antenna port 3 405-*d* may be used to transmit SRS on a second symbol, the antenna port 2 405-*c* used on the odd REs and the antenna port 3 405-d used on the even REs. As such, signals using all four antenna ports 405 may sent every two symbols, and the base station 105 may update the precoding calculation every two symbols. In some cases, the SRS may be used for tight control of downlink precoding. For instance, the base station 105 may apply a hypothesis test on a first SRS and a second SRS to identify one or more of an ACK feedback, a NACK feedback, supplemental feedback information, or a combination thereof. As a result, the number of antenna ports 405 sent may be equal to the number of precoded downlink antenna ports 405. Additionally, or alternatively, feedback information may be duplicated on a number of antenna ports 405 to enhance signal robustness (e.g., the feedback information may be duplicated on two antenna ports 405). In some cases, the base station 105 may identify the feedback information that the UE 115 may have modulated on the SRS by applying hypothesis testing on all of the options of feedback, and may select the most likely feedback.

In some cases, the UE 115 may embed feedback information (e.g., ACK/NACK information) in the SRS by applying cyclic shift to the sequence. For example, the UE 115 may send one of seven sequences described herein for $c_x$ (e.g., based on a compression code). Each symbol may carry feedback information (e.g., ACK/NACK information) for all of the 4 CBGs, and using a compression scheme. In some examples, the UE 115 may determine that it may use seven waveforms (and therefore seven cyclic shifts) to transmit the information. In some cases, each of the seven cyclic shifts may encode one of seven different waveforms. By decoding which cyclic shift is used by the UE 115, the base station 105 may determine the feedback information (e.g., ACK/NACK information) for the four CBs. In some examples, the UE 115 may use two cyclic shifts (e.g., one per symbol because the feedback for different TBs may be sent in each symbol).

In some examples, the feedback information (e.g., ACK/NACK information) may be modulated according to $c_x$. For example, $c_1$ in the first waveform (e.g., in the first symbol and the first RE) may represent a shift in the index of all of the sequence of pilots (e.g., 0 to 11 for N=12). In the example shown in FIG. 4, the antenna port 0 405-a may have an index of $r_0$ where n may be 0 through 11. That is, there may be 12 antenna ports 0 405-a with the index $r_{o,n}$ across the 24 REs (e.g., $r_{0,0}$ to $r_{0,11}$). In some cases, the UE 115 may apply a cyclic shift to the REs corresponding to the antenna port 0 405-a. For example, if the UE 115 sends ACK/NACK (e.g., a waveform), $c_1=0$ and the base station 105 may receive the original sequence (e.g., the original waveform). If the UE 115 sends a different ACK/NACK with a different waveform, the UE 115 may use a cyclic shift of 2 such that the first RE may have the index $r_{0,2}$. When the base station 105 receives this RE, it may determine that the 12 REs is shifted by 2, indicating to the base station 105 a type of ACK/NACK transmitted by the UE 115.

Figure 5:
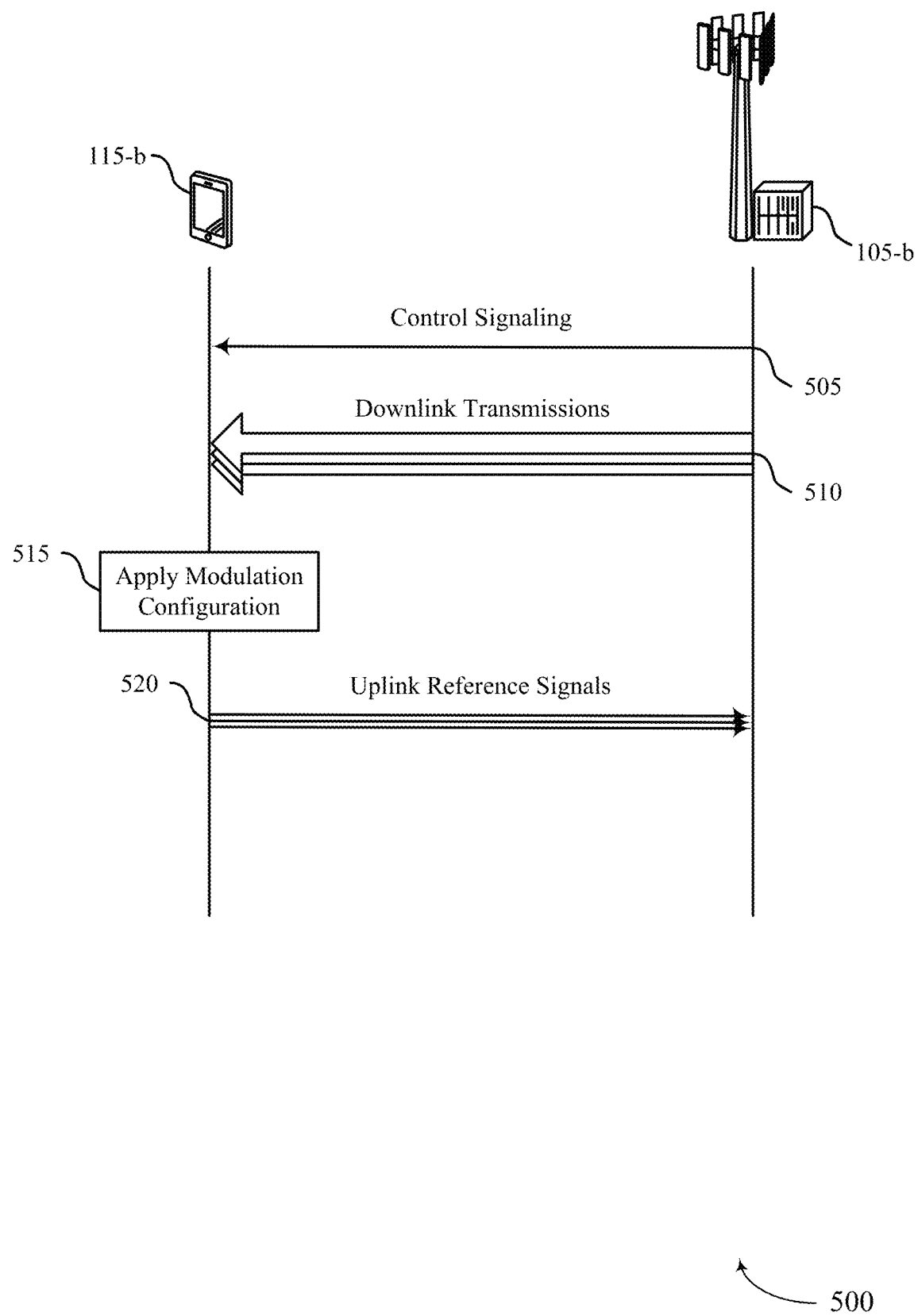
FIG. 5 illustrates an example of a process flow that supports modulating reference signals for conveying feedback information in accordance with aspects of the present disclosure.

FIG. 5 illustrates an example of a process flow 500 that supports modulating reference signals for conveying feedback information in accordance with aspects of the present disclosure. The process flow 500 may implement or be implemented by aspects of wireless communications system 100. For example, the process flow 500 may illustrate operations between a UE 115-b and a base station 105-b, which may be examples of a UE 115 and a base station 105, as described with reference to FIG. 1. In the following description of the process flow 500, the operations between the UE 115-b and the base station 105-b may be transmitted in a different order than the example order shown, or the operations performed by the UE 115-b and the base station 105-b may be performed in different orders or at different times. Some operations may also be omitted from the process flow 500, and other operations may be added to the process flow 500.

At 505, the UE 115-b may receive, from the base station 105-b, control signaling indicating to the UE 115-b to convey feedback information by modulating an uplink reference signal (e.g., an SRS). In some cases, the UE 115-b may transmit a capability of the UE 115-b to support conveying the feedback information.

At 510, the UE 115-b may receive a set of downlink transmissions from the base station 105-b. In some cases, the downlink transmissions may include a set of time-frequency resources which may include a set of TBs and CBs of different sizes.

At 515, the UE 115-b may apply a modulation configuration to the set of uplink reference signals. In some cases, the UE 115-b may embed the ACK/NACK information in the uplink reference signal using cyclic shifts. For example, each set of uplink reference signals may be modulated by a number of cyclic shifts, where one or more cyclic shifts may indicate ACK/NACK or a different type of feedback for a set of CBs.

At 520, the UE 115-b may transmit, to the base station 105-b, a set of uplink reference signals (e.g., SRSs) in response to receiving the set of downlink messages. In some examples, the set of uplink reference signals are modulated by the UE 115-b to convey the feedback information for the set of downlink signals. In some cases, the UE 115-b may convey the feedback information based on applying the modulation configuration to the set of uplink reference signals.

Figure 6:
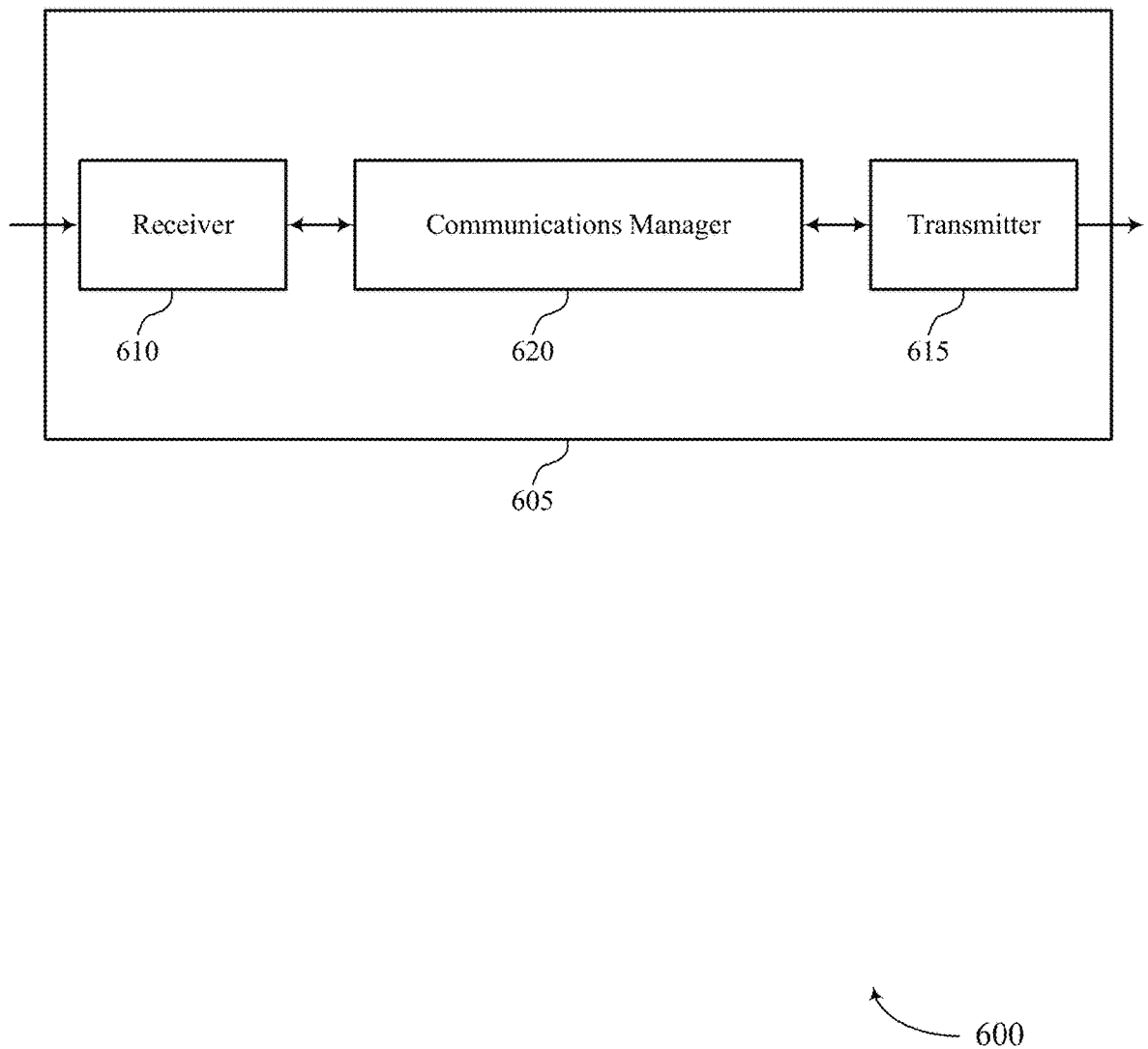
FIGS. 6 and 7 show block diagrams of devices that support modulating reference signals for conveying feedback information in accordance with aspects of the present disclosure.

FIG. 6 shows a block diagram 600 of a device 605 that supports modulating reference signals for conveying feedback information in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to modulating reference signals for conveying feedback information). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to modulating reference signals for conveying feedback information). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of modulating reference signals for conveying feedback information as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving, from a base station, control signaling indicating to the UE to convey feedback information by modulating an uplink reference signal. The communications manager 620 may be configured as or otherwise support a means for receiving, from the base station, a set of downlink messages. The communications manager 620 may be configured as or otherwise support a means for transmitting, to the base station, a set of uplink reference signals in response to receiving the set of downlink messages, where the set of uplink reference signals are modulated by the UE to convey the feedback information for the set of downlink messages according to the control signaling.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for modulating reference signals for conveying feedback information, which may improve resource efficiency and improve the rate of successful decoding. Further, in some examples, modulating reference signals may allow for faster feedback which may decrease power consumption and improve user experience. As such, supported techniques may include improved network operations, and, in some examples, may promote network efficiencies, among other benefits.

Figure 7:
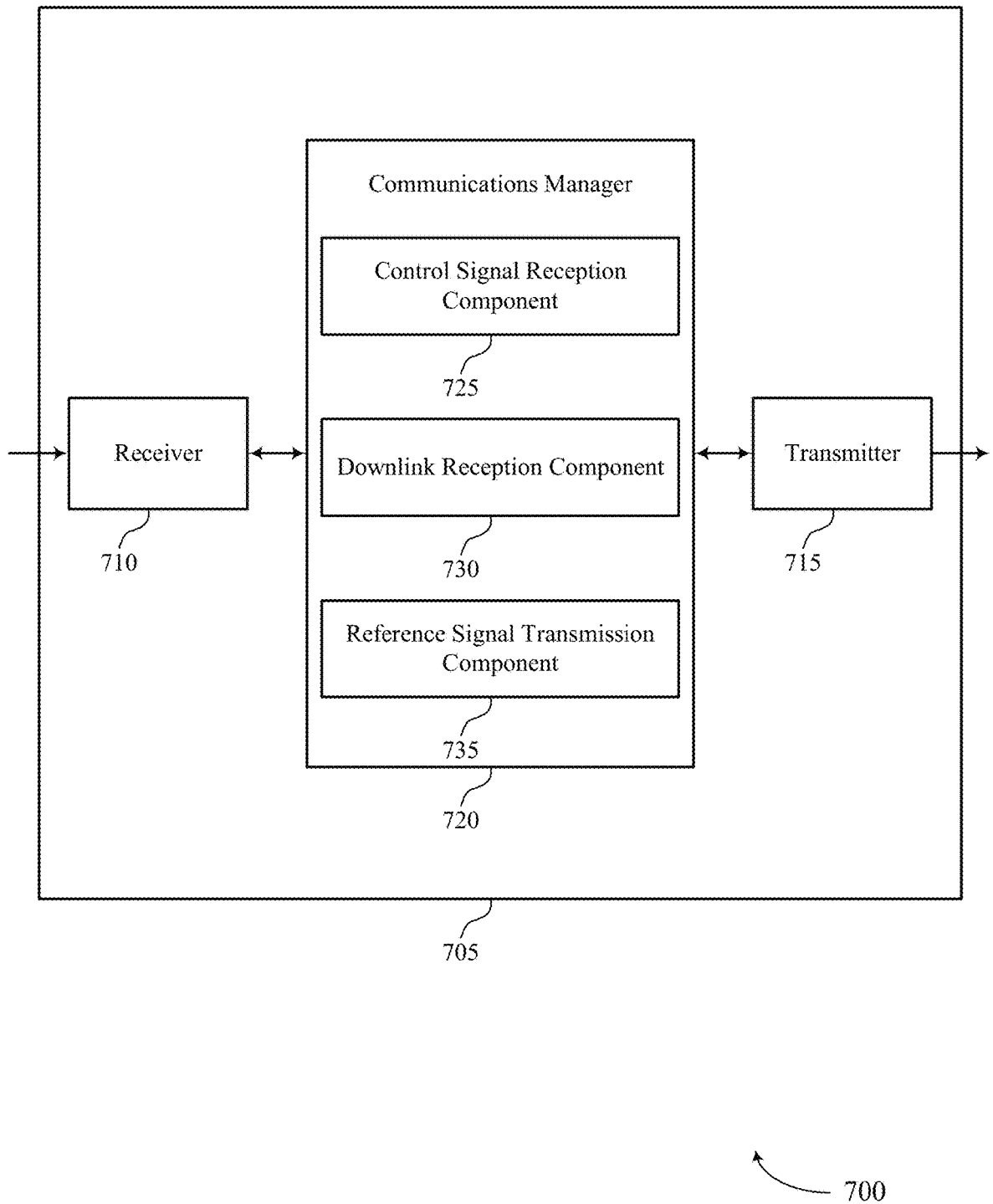

FIG. 7 shows a block diagram 700 of a device 705 that supports modulating reference signals for conveying feedback information in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to modulating reference signals for conveying feedback information). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to modulating reference signals for conveying feedback information). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of modulating reference signals for conveying feedback information as described herein. For example, the communications manager 720 may include a control signal reception component 725, a downlink reception component 730, a reference signal transmission component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The control signal reception component 725 may be configured as or otherwise support a means for receiving, from a base station, control signaling indicating to the UE to convey feedback information by modulating an uplink reference signal. The downlink reception component 730 may be configured as or otherwise support a means for receiving, from the base station, a set of downlink messages. The reference signal transmission component 735 may be configured as or otherwise support a means for transmitting, to the base station, a set of uplink reference signals in response to receiving the set of downlink messages, where the set of uplink reference signals are modulated by the UE to convey the feedback information for the set of downlink messages according to the control signaling.

Figure 8:
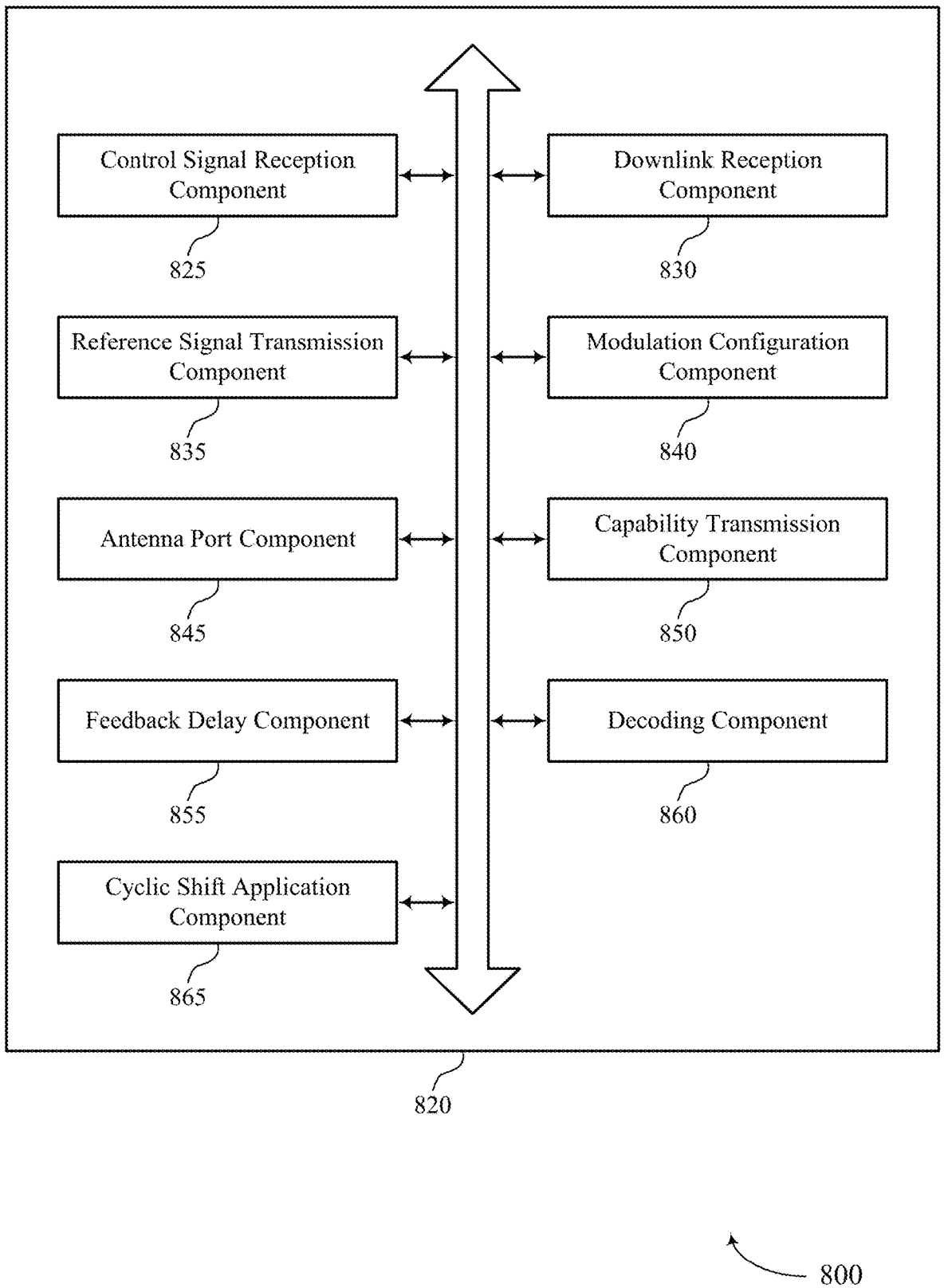
FIG. 8 shows a block diagram of a communications manager that supports modulating reference signals for conveying feedback information in accordance with aspects of the present disclosure.

FIG. 8 shows a block diagram 800 of a communications manager 820 that supports modulating reference signals for conveying feedback information in accordance with aspects of the present disclosure. The communications manager 820 may be an example of aspects of a communications manager 620, a communications manager 720, or both, as described herein. The communications manager 820, or various components thereof, may be an example of means for performing various aspects of modulating reference signals for conveying feedback information as described herein. For example, the communications manager 820 may include a control signal reception component 825, a downlink reception component 830, a reference signal transmission component 835, a modulation configuration component 840, an antenna port component 845, a capability transmission component 850, a feedback delay component 855, a decoding component 860, a cyclic shift application component 865, or any combination thereof. Each of these components may communicate, directly or indirectly, with one another (e.g., via one or more buses).

The communications manager 820 may support wireless communication at a UE in accordance with examples as disclosed herein. The control signal reception component 825 may be configured as or otherwise support a means for receiving, from a base station, control signaling indicating to the UE to convey feedback information by modulating an uplink reference signal. The downlink reception component 830 may be configured as or otherwise support a means for receiving, from the base station, a set of downlink messages. The reference signal transmission component 835 may be configured as or otherwise support a means for transmitting, to the base station, a set of uplink reference signals in response to receiving the set of downlink messages, where the set of uplink reference signals are modulated by the UE to convey the feedback information for the set of downlink messages according to the control signaling.

In some examples, the modulation configuration component 840 may be configured as or otherwise support a means for applying a modulation configuration to the set of uplink reference signals, where conveying the feedback information is based on applying the modulation configuration.

In some examples, to support applying the modulation configuration, the cyclic shift application component 865 may be configured as or otherwise support a means for applying one or more first cyclic shifts from a set of cyclic shifts to a first uplink reference signal of the set of uplink reference signals. In some examples, to support applying the modulation configuration, the cyclic shift application component 865 may be configured as or otherwise support a means for applying one or more second cyclic shifts from the set of cyclic shifts to a second uplink reference signal of the set of uplink reference signals, where the one or more first cyclic shifts and the one or more second cyclic shifts indicate one or more of an ACK feedback, a NACK feedback, supplemental feedback information, or a combination thereof.

In some examples, to support applying the modulation configuration, the modulation configuration component 840 may be configured as or otherwise support a means for modulating each uplink reference signal of the set of uplink reference signals by using a sequence of pilot tones from a set of sequences of pilot tones.

In some examples, the antenna port component 845 may be configured as or otherwise support a means for identifying a set of antenna ports to convey the feedback information for the set of downlink messages based on the control signaling, where transmitting the set of uplink reference signals includes transmitting the set of uplink reference signals on the set of antenna ports.

In some examples, the set of antenna ports is at least one of TDM-ed, FDM-ed, CDM-ed, or a combination thereof. In some examples, the set of antenna ports is equal to a number of precoded downlink antenna ports. In some examples, the feedback information is repeated on at least two antenna ports from the set of antenna ports.

In some examples, the capability transmission component 850 may be configured as or otherwise support a means for transmitting, to the base station, a capability of the UE to support conveying of the feedback information for the set of downlink messages according to the control signaling, where receiving the control signaling is based on the transmitted capability.

In some examples, the feedback delay component 855 may be configured as or otherwise support a means for identifying a feedback delay parameter based on the control signaling, where transmitting the set of uplink reference signals includes transmitting the set of uplink reference signals based on the feedback delay parameter. In some examples, the feedback delay parameter is based on a frequency of conveying the feedback information or a UE capability or both.

In some examples, the decoding component 860 may be configured as or otherwise support a means for determining that a decoding procedure of a subset of the set of downlink messages is unsuccessful, where transmitting the set of uplink reference signals includes transmitting a NACK feedback for the set of downlink messages based on the subset of the set of downlink messages satisfying a threshold. In some examples, the control signaling indicates at least one of a slot number, a frame number, a symbol number, a cell identifier, a UE identifier, or a combination thereof.

In some examples, to support transmitting the set of uplink reference signals, the reference signal transmission component 835 may be configured as or otherwise support a means for transmitting the set of uplink reference signals in a full duplex mode of communication. In some examples, the set of uplink reference signals includes a set of SRSs.

Figure 9:
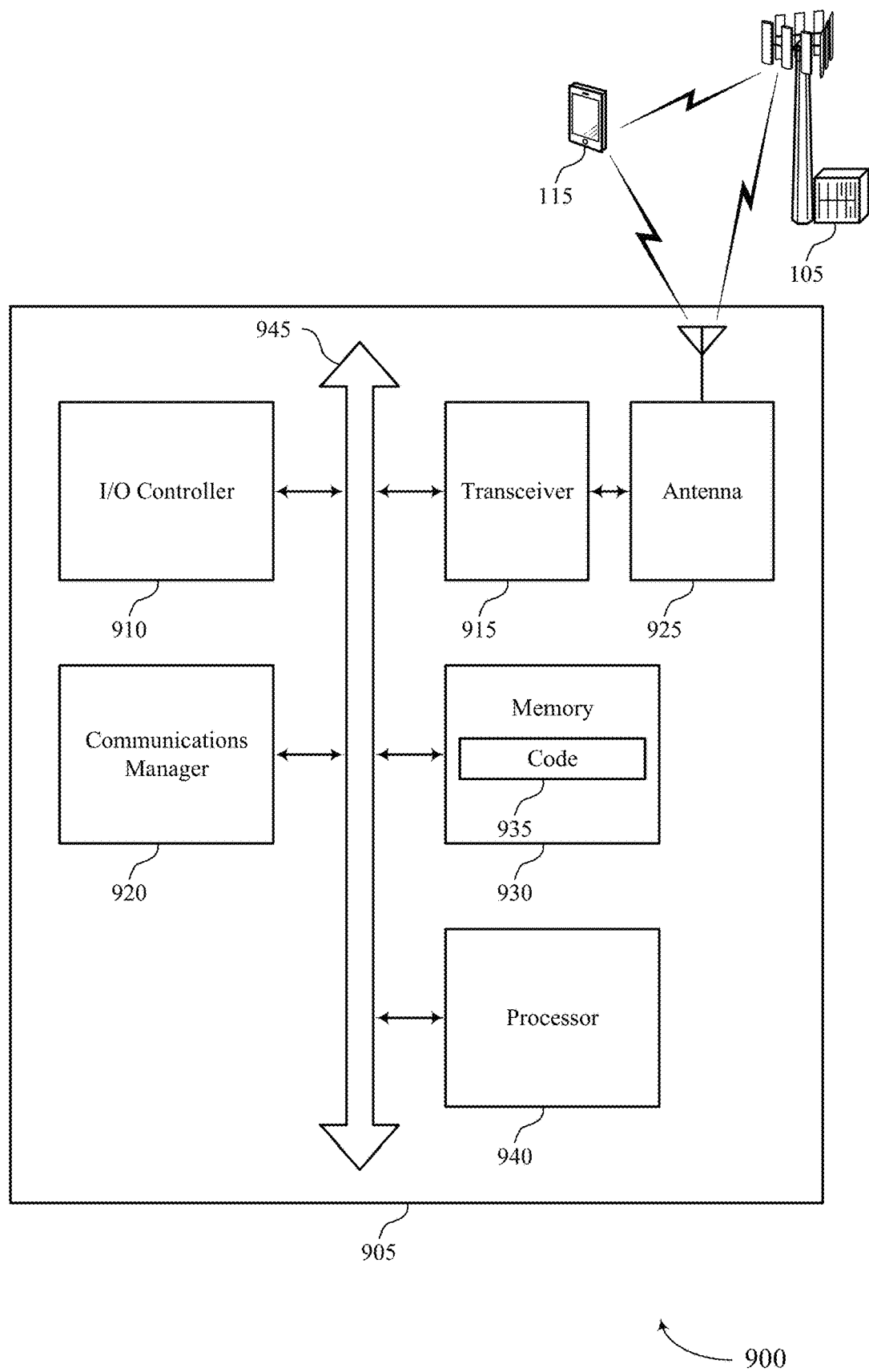
FIG. 9 shows a diagram of a system including a device that supports modulating reference signals for conveying feedback information in accordance with aspects of the present disclosure.

FIG. 9 shows a diagram of a system 900 including a device 905 that supports modulating reference signals for conveying feedback information in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting modulating reference signals for conveying feedback information). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving, from a base station, control signaling indicating to the UE to convey feedback information by modulating an uplink reference signal. The communications manager 920 may be configured as or otherwise support a means for receiving, from the base station, a set of downlink messages. The communications manager 920 may be configured as or otherwise support a means for transmitting, to the base station, a set of uplink reference signals in response to receiving the set of downlink messages, where the set of uplink reference signals are modulated by the UE to convey the feedback information for the set of downlink messages according to the control signaling.

By including or configuring the communications manager 920 in accordance with examples as described herein, the device 905 may support techniques for modulating reference signals for conveying feedback information, which may improve resource efficiency and improve the rate of successful decoding. Further, in some examples, modulating reference signals may allow for faster feedback which may decrease power consumption and improve user experience. As such, supported techniques may include improved network operations, and, in some examples, may promote network efficiencies, among other benefits.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of modulating reference signals for conveying feedback information as described herein, or the processor 940 and the memory 930 may be otherwise configured to perform or support such operations.

Figure 10:
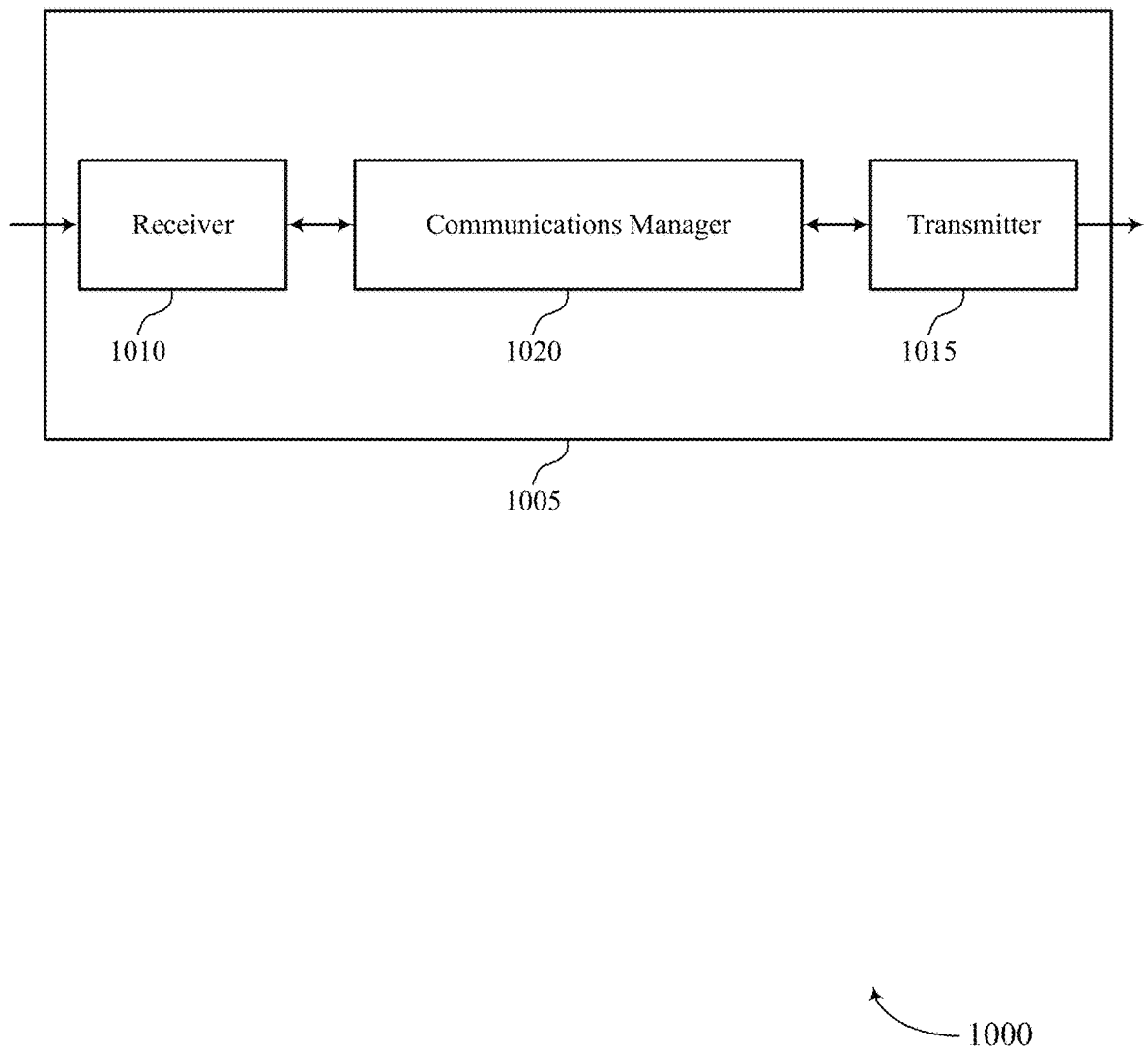
FIGS. 10 and 11 show block diagrams of devices that support modulating reference signals for conveying feedback information in accordance with aspects of the present disclosure.

FIG. 10 shows a block diagram 1000 of a device 1005 that supports modulating reference signals for conveying feedback information in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to modulating reference signals for conveying feedback information). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to modulating reference signals for conveying feedback information). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of modulating reference signals for conveying feedback information as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for transmitting, to a UE, control signaling indicating to the UE to convey feedback information by modulating an uplink reference signal. The communications manager 1020 may be configured as or otherwise support a means for transmitting, to the UE, a set of downlink messages. The communications manager 1020 may be configured as or otherwise support a means for receiving, from the UE, a set of uplink reference signals in response to receiving the set of downlink messages, where the set of uplink reference signals are modulated by the UE to convey the feedback information for the set of downlink messages according to the control signaling.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for modulating reference signals for conveying feedback information, which may improve resource efficiency and improve the rate of successful decoding. Further, in some examples, modulating reference signals may allow for faster feedback which may decrease power consumption and improve user experience.

Figure 11:
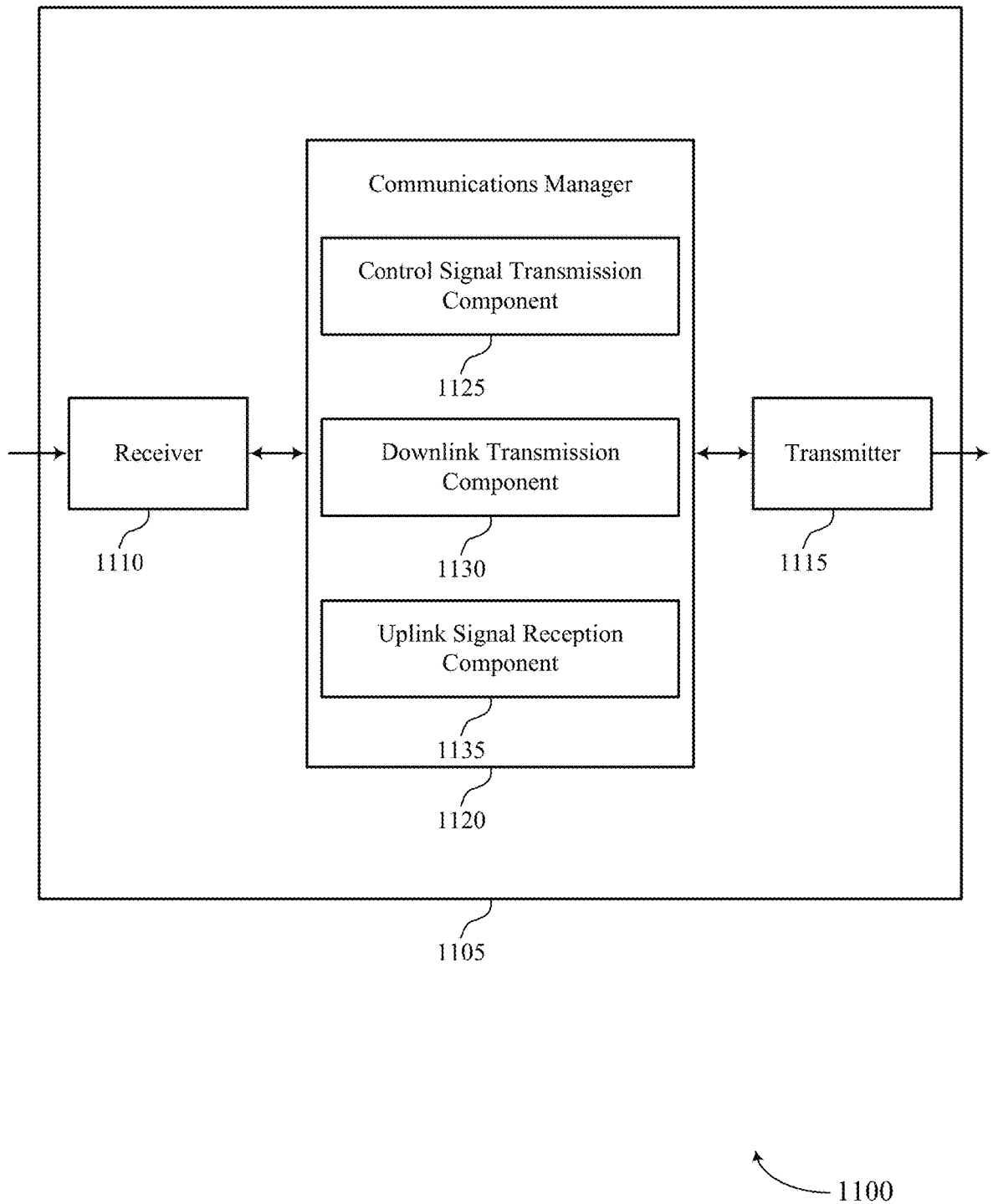

FIG. 11 shows a block diagram 1100 of a device 1105 that supports modulating reference signals for conveying feedback information in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to modulating reference signals for conveying feedback information). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to modulating reference signals for conveying feedback information). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of modulating reference signals for conveying feedback information as described herein. For example, the communications manager 1120 may include a control signal transmission component 1125, a downlink transmission component 1130, an uplink signal reception component 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The control signal transmission component 1125 may be configured as or otherwise support a means for transmitting, to a UE, control signaling indicating to the UE to convey feedback information by modulating an uplink reference signal. The downlink transmission component 1130 may be configured as or otherwise support a means for transmitting, to the UE, a set of downlink messages. The uplink signal reception component 1135 may be configured as or otherwise support a means for receiving, from the UE, a set of uplink reference signals in response to receiving the set of downlink messages, where the set of uplink reference signals are modulated by the UE to convey the feedback information for the set of downlink messages according to the control signaling.

Figure 12:
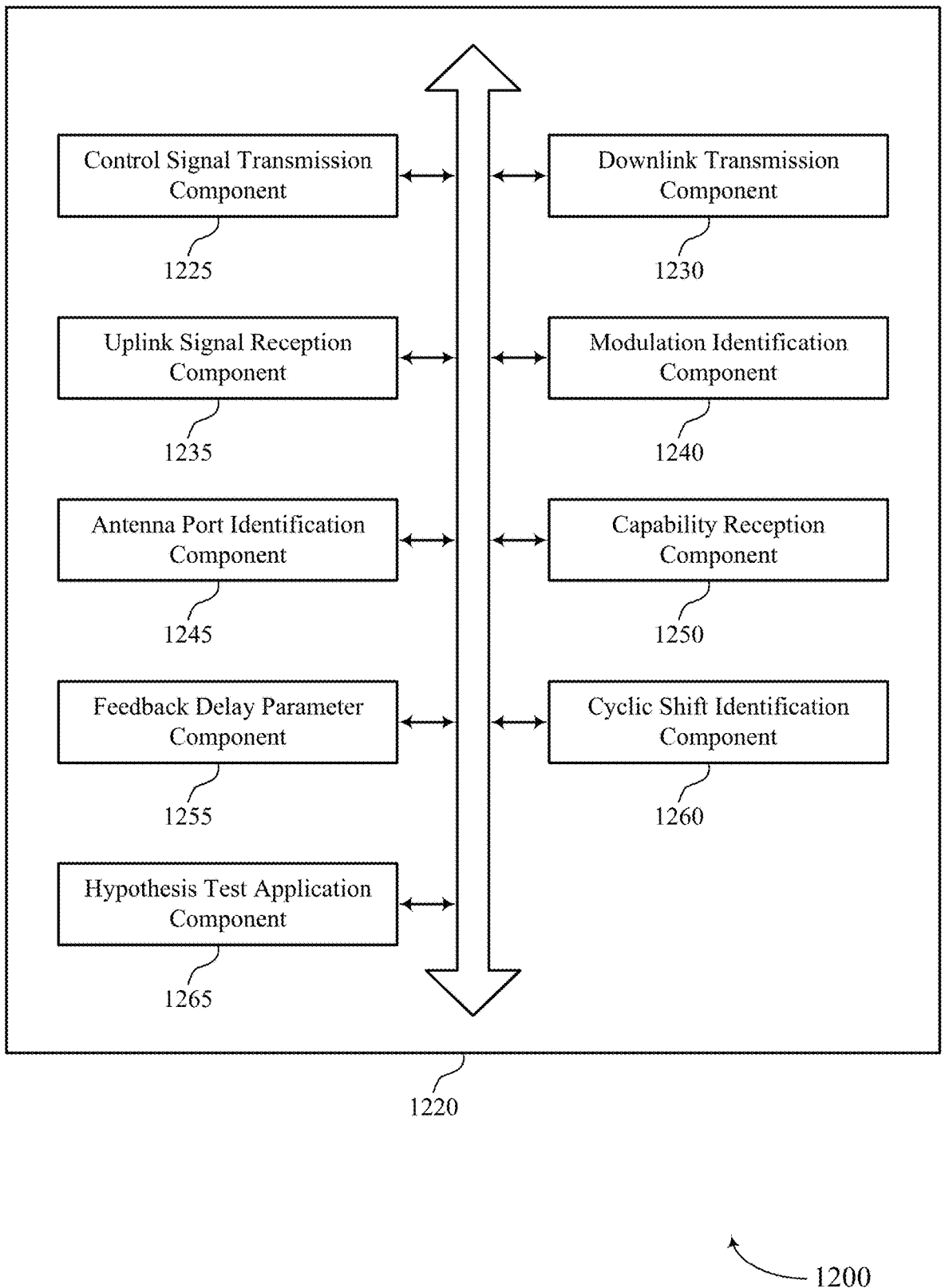
FIG. 12 shows a block diagram of a communications manager that supports modulating reference signals for conveying feedback information in accordance with aspects of the present disclosure.

FIG. 12 shows a block diagram 1200 of a communications manager 1220 that supports modulating reference signals for conveying feedback information in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of modulating reference signals for conveying feedback information as described herein. For example, the communications manager 1220 may include a control signal transmission component 1225, a downlink transmission component 1230, an uplink signal reception component 1235, a modulation identification component 1240, an antenna port identification component 1245, a capability reception component 1250, a feedback delay parameter component 1255, a cyclic shift identification component 1260, a hypothesis test application component 1265, or any combination thereof. Each of these components may communicate, directly or indirectly, with one another (e.g., via one or more buses).

The communications manager 1220 may support wireless communication at a base station in accordance with examples as disclosed herein. The control signal transmission component 1225 may be configured as or otherwise support a means for transmitting, to a UE, control signaling indicating to the UE to convey feedback information by modulating an uplink reference signal. The downlink transmission component 1230 may be configured as or otherwise support a means for transmitting, to the UE, a set of downlink messages. The uplink signal reception component 1235 may be configured as or otherwise support a means for receiving, from the UE, a set of uplink reference signals in response to receiving the set of downlink messages, where the set of uplink reference signals are modulated by the UE to convey the feedback information for the set of downlink messages according to the control signaling.

In some examples, the modulation identification component 1240 may be configured as or otherwise support a means for identifying a modulation configuration applied to the set of uplink reference signals, where conveying the feedback information is based on the modulation configuration applied to the set of uplink reference signals.

In some examples, to support identifying the modulation configuration, the cyclic shift identification component 1260 may be configured as or otherwise support a means for identifying one or more first cyclic shifts from a set of cyclic shifts applied to a first uplink reference signal of the set of uplink reference signals. In some examples, to support identifying the modulation configuration, the cyclic shift identification component 1260 may be configured as or otherwise support a means for identifying one or more second cyclic shifts from the set of cyclic shifts applied to a second uplink reference signal of the set of uplink reference signals, where the one or more first cyclic shifts and the one or more second cyclic shifts indicate one or more of an ACK feedback, a NACK feedback, supplemental feedback information, or a combination thereof.

In some examples, the hypothesis test application component 1265 may be configured as or otherwise support a means for applying a hypothesis test on the first uplink reference signal of the set of uplink reference signals and the second uplink reference signal of the set of uplink reference signals to identify one or more of the ACK feedback, the NACK feedback, the supplemental feedback information, or a combination thereof.

In some examples, to support identifying the modulation configuration, the modulation identification component 1240 may be configured as or otherwise support a means for identifying that each uplink reference signal of the set of uplink reference signals is modulated using a sequence of pilot tones from a set of sequences of pilot tones.

In some examples, the antenna port identification component 1245 may be configured as or otherwise support a means for identifying a set of antenna ports to convey the feedback information for the set of downlink messages based on the control signaling, where receiving the set of uplink reference signals includes receiving the set of uplink reference signals on the set of antenna ports. In some examples, the set of antenna ports is at least one of TDM-ed, FDM-ed, CDM-ed, or a combination thereof.

In some examples, the capability reception component 1250 may be configured as or otherwise support a means for receiving, from the UE, a capability of the UE to support conveying of the feedback information for the set of downlink messages according to the control signaling, where transmitting the control signaling is based on the received capability.

In some examples, the feedback delay parameter component 1255 may be configured as or otherwise support a means for identifying a feedback delay parameter based on the control signaling, where receiving the set of uplink reference signals includes receiving the set of uplink reference signals based on the feedback delay parameter. In some examples, the feedback delay parameter is based on a frequency of conveying the feedback information or a UE capability or both.

Figure 13:
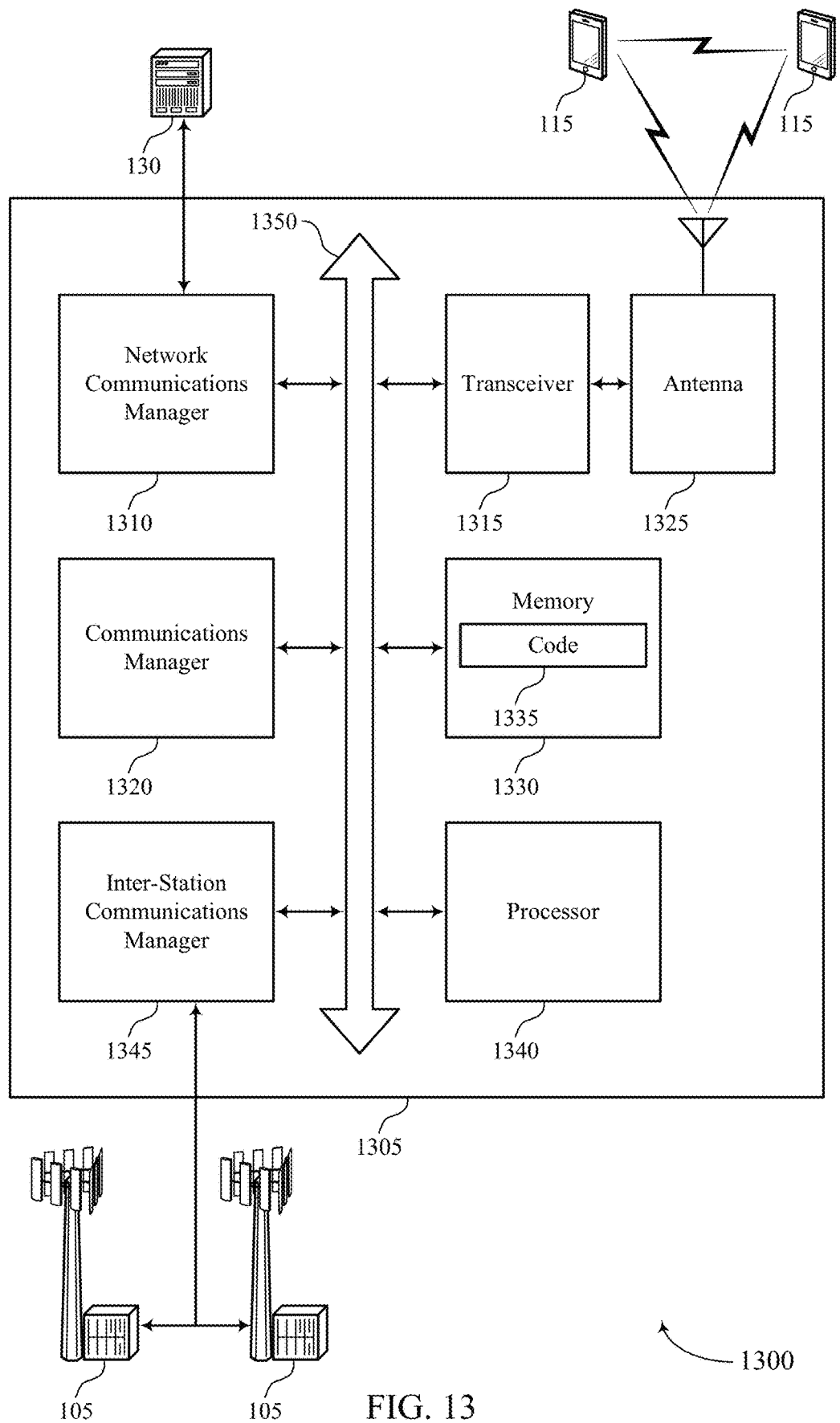
FIG. 13 shows a diagram of a system including a device that supports modulating reference signals for conveying feedback information in accordance with aspects of the present disclosure.

FIG. 13 shows a diagram of a system 1300 including a device 1305 that supports modulating reference signals for conveying feedback information in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting modulating reference signals for conveying feedback information). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for transmitting, to a UE, control signaling indicating to the UE to convey feedback information by modulating an uplink reference signal. The communications manager 1320 may be configured as or otherwise support a means for transmitting, to the UE, a set of downlink messages. The communications manager 1320 may be configured as or otherwise support a means for receiving, from the UE, a set of uplink reference signals in response to receiving the set of downlink messages, where the set of uplink reference signals are modulated by the UE to convey the feedback information for the set of downlink messages according to the control signaling.

By including or configuring the communications manager 1320 in accordance with examples as described herein, the device 1305 may support techniques for modulating reference signals for conveying feedback information, which may improve resource efficiency and improve the rate of successful decoding. Further, in some examples, modulating reference signals may allow for faster feedback which may decrease power consumption and improve user experience. As such, supported techniques may include improved network operations, and, in some examples, may promote network efficiencies, among other benefits.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of modulating reference signals for conveying feedback information as described herein, or the processor 1340 and the memory 1330 may be otherwise configured to perform or support such operations.

Figure 14:
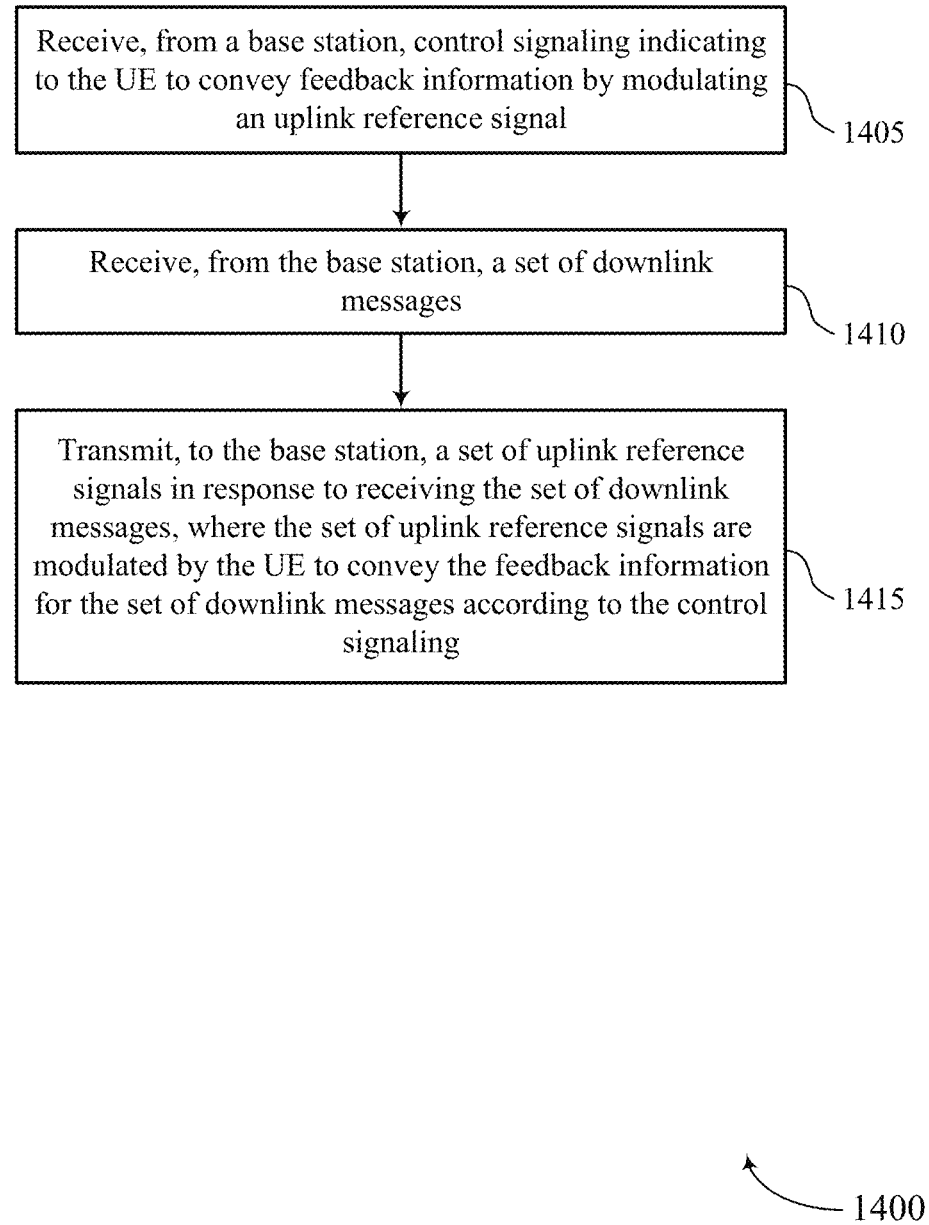
FIGS. 14 through 18 show flowcharts illustrating methods that support modulating reference signals for conveying feedback information in accordance with aspects of the present disclosure.

FIG. 14 shows a flowchart illustrating a method 1400 that supports modulating reference signals for conveying feedback information in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, control signaling indicating to the UE to convey feedback information by modulating an uplink reference signal. The operations of 1405 may be performed in accordance with examples as disclosed herein. In some examples, aspects of the operations of 1405 may be performed by a control signal reception component 825 as described with reference to FIG. 8.

At 1410, the method may include receiving, from the base station, a set of downlink messages. The operations of 1410 may be performed in accordance with examples as disclosed herein. In some examples, aspects of the operations of 1410 may be performed by a downlink reception component 830 as described with reference to FIG. 8.

At 1415, the method may include transmitting, to the base station, a set of uplink reference signals in response to receiving the set of downlink messages, where the set of uplink reference signals are modulated by the UE to convey the feedback information for the set of downlink messages according to the control signaling. The operations of 1415 may be performed in accordance with examples as disclosed herein. In some examples, aspects of the operations of 1415 may be performed by a reference signal transmission component 835 as described with reference to FIG. 8.

Figure 15:
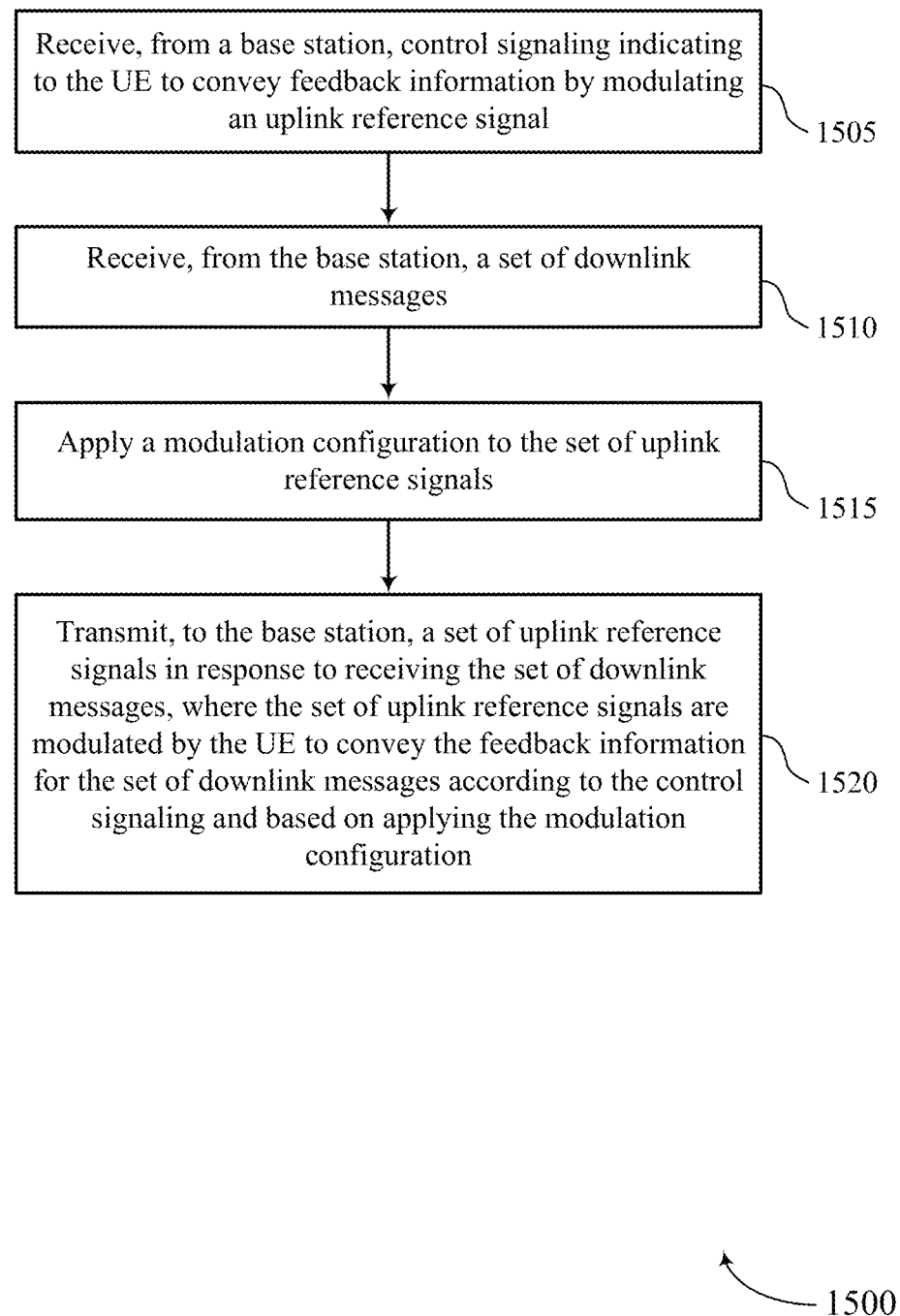

FIG. 15 shows a flowchart illustrating a method 1500 that supports modulating reference signals for conveying feedback information in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, control signaling indicating to the UE to convey feedback information by modulating an uplink reference signal. The operations of 1505 may be performed in accordance with examples as disclosed herein. In some examples, aspects of the operations of 1505 may be performed by a control signal reception component 825 as described with reference to FIG. 8.

At 1510, the method may include receiving, from the base station, a set of downlink messages. The operations of 1510 may be performed in accordance with examples as disclosed herein. In some examples, aspects of the operations of 1510 may be performed by a downlink reception component 830 as described with reference to FIG. 8.

At 1515, the method may include applying a modulation configuration to the set of uplink reference signals. The operations of 1515 may be performed in accordance with examples as disclosed herein. In some examples, aspects of the operations of 1515 may be performed by a modulation configuration component 840 as described with reference to FIG. 8.

At 1520, the method may include transmitting, to the base station, a set of uplink reference signals in response to receiving the set of downlink messages, where the set of uplink reference signals are modulated by the UE to convey the feedback information for the set of downlink messages according to the control signaling and based on applying the modulation configuration. The operations of 1520 may be performed in accordance with examples as disclosed herein. In some examples, aspects of the operations of 1520 may be performed by a reference signal transmission component 835 as described with reference to FIG. 8.

Figure 16:
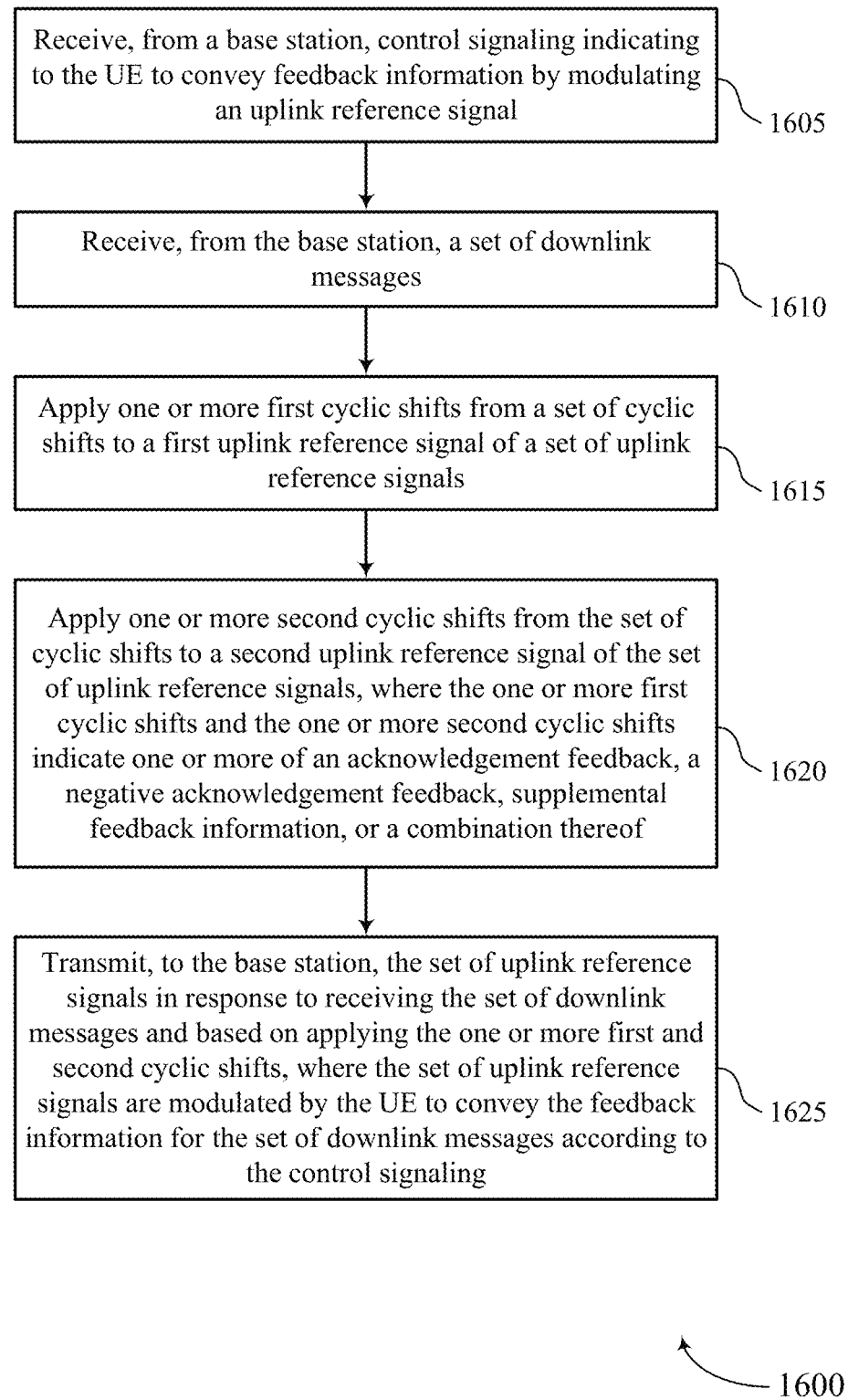

FIG. 16 shows a flowchart illustrating a method 1600 that supports modulating reference signals for conveying feedback information in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, control signaling indicating to the UE to convey feedback information by modulating an uplink reference signal. The operations of 1605 may be performed in accordance with examples as disclosed herein. In some examples, aspects of the operations of 1605 may be performed by a control signal reception component 825 as described with reference to FIG. 8.

At 1610, the method may include receiving, from the base station, a set of downlink messages. The operations of 1610 may be performed in accordance with examples as disclosed herein. In some examples, aspects of the operations of 1610 may be performed by a downlink reception component 830 as described with reference to FIG. 8.

At 1615, the method may include applying one or more first cyclic shifts from a set of cyclic shifts to a first uplink reference signal of a set of uplink reference signals. The operations of 1615 may be performed in accordance with examples as disclosed herein. In some examples, aspects of the operations of 1615 may be performed by a cyclic shift application component 865 as described with reference to FIG. 8.

At 1620, the method may include applying one or more second cyclic shifts from the set of cyclic shifts to a second uplink reference signal of the set of uplink reference signals, where the one or more first cyclic shifts and the one or more second cyclic shifts indicate one or more of an ACK feedback, a NACK feedback, supplemental feedback information, or a combination thereof. The operations of 1620 may be performed in accordance with examples as disclosed herein. In some examples, aspects of the operations of 1620 may be performed by a cyclic shift application component 865 as described with reference to FIG. 8.

At 1625, the method may include transmitting, to the base station, the set of uplink reference signals in response to receiving the set of downlink messages and based on applying the one or more first and second cyclic shifts, where the set of uplink reference signals are modulated by the UE to convey the feedback information for the set of downlink messages according to the control signaling. The operations of 1625 may be performed in accordance with examples as disclosed herein. In some examples, aspects of the operations of 1625 may be performed by a reference signal transmission component 835 as described with reference to FIG. 8.

Figure 17:
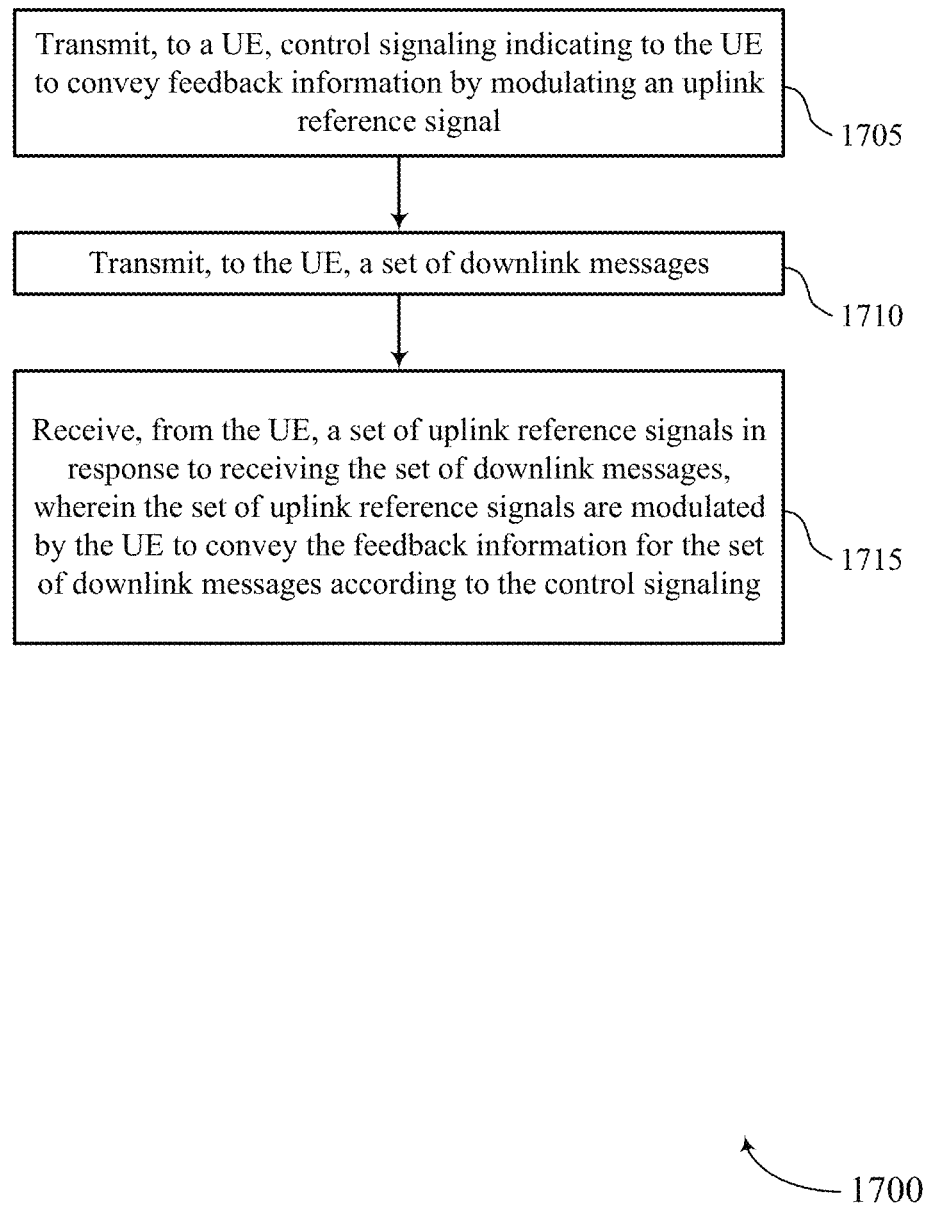

FIG. 17 shows a flowchart illustrating a method 1700 that supports modulating reference signals for conveying feedback information in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, control signaling indicating to the UE to convey feedback information by modulating an uplink reference signal. The operations of 1705 may be performed in accordance with examples as disclosed herein. In some examples, aspects of the operations of 1705 may be performed by a control signal transmission component 1225 as described with reference to FIG. 12.

At 1710, the method may include transmitting, to the UE, a set of downlink messages. The operations of 1710 may be performed in accordance with examples as disclosed herein. In some examples, aspects of the operations of 1710 may be performed by a downlink transmission component 1230 as described with reference to FIG. 12.

At 1715, the method may include receiving, from the UE, a set of uplink reference signals in response to receiving the set of downlink messages, where the set of uplink reference signals are modulated by the UE to convey the feedback information for the set of downlink messages according to the control signaling. The operations of 1715 may be performed in accordance with examples as disclosed herein. In some examples, aspects of the operations of 1715 may be performed by an uplink signal reception component 1235 as described with reference to FIG. 12.

Figure 18:
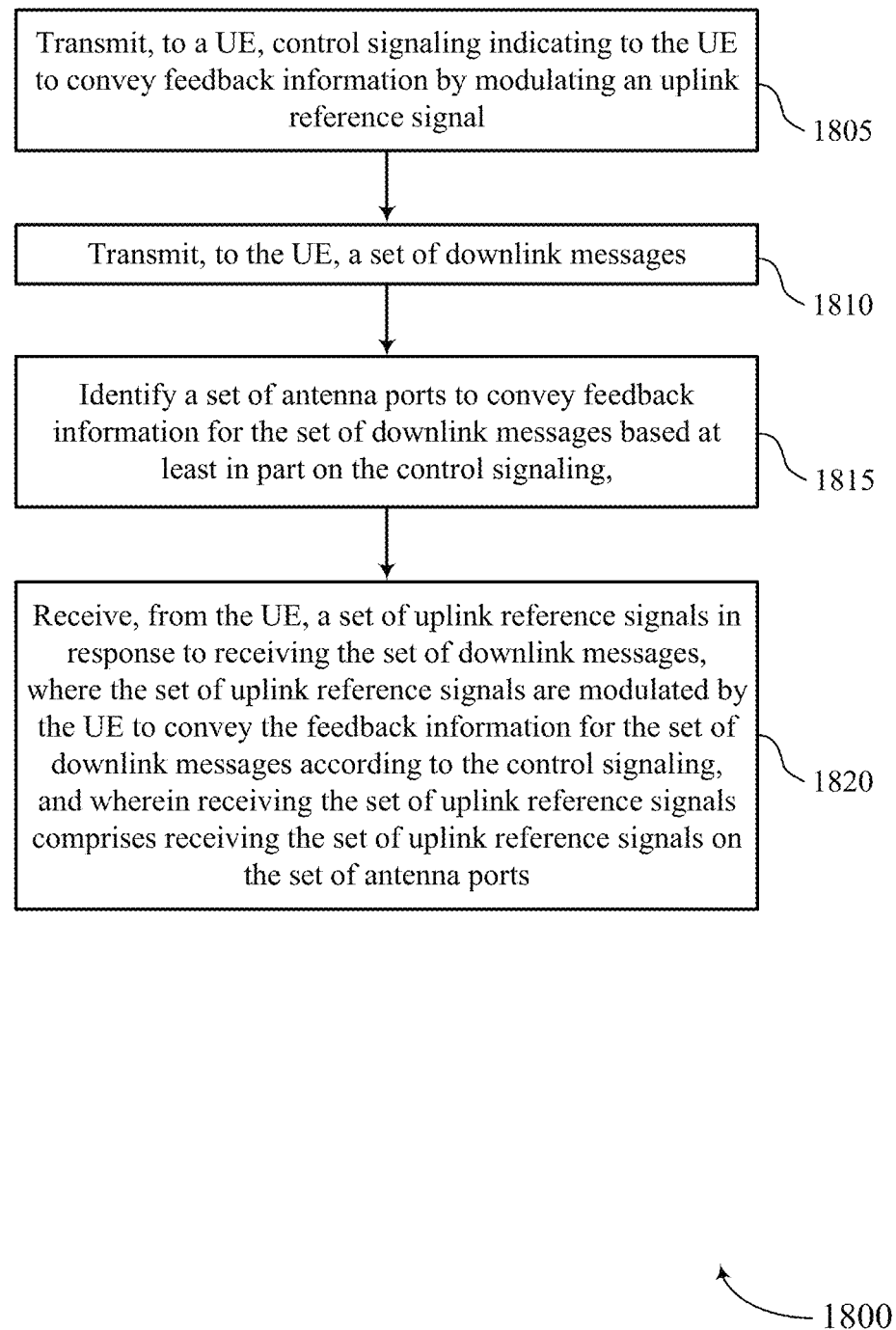

FIG. 18 shows a flowchart illustrating a method 1800 that supports modulating reference signals for conveying feedback information in accordance with aspects of the present disclosure. The operations of the method 1800 may be implemented by a base station or its components as described herein. For example, the operations of the method 1800 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, control signaling indicating to the UE to convey feedback information by modulating an uplink reference signal. The operations of 1805 may be performed in accordance with examples as disclosed herein. In some examples, aspects of the operations of 1805 may be performed by a control signal transmission component 1225 as described with reference to FIG. 12.

At 1810, the method may include transmitting, to the UE, a set of downlink messages. The operations of 1810 may be performed in accordance with examples as disclosed herein. In some examples, aspects of the operations of 1810 may be performed by a downlink transmission component 1230 as described with reference to FIG. 12.

At 1815, the method may include identifying a set of antenna ports to convey the feedback information for the set of downlink messages based on the control signaling, where receiving the set of uplink reference signals includes receiving the set of uplink reference signals on the set of antenna ports. The operations of 1815 may be performed in accordance with examples as disclosed herein. In some examples, aspects of the operations of 1815 may be performed by an antenna port identification component 1245 as described with reference to FIG. 12.

At 1820, the method may include receiving, from the UE, a set of uplink reference signals in response to receiving the set of downlink messages, where the set of uplink reference signals are modulated by the UE to convey the feedback information for the set of downlink messages according to the control signaling. The operations of 1820 may be performed in accordance with examples as disclosed herein. In some examples, aspects of the operations of 1820 may be performed by an uplink signal reception component 1235 as described with reference to FIG. 12.

Aspect 1: A method for wireless communication at a UE, comprising: receiving, from a base station, control signaling indicating to the UE to convey feedback information by modulating an uplink reference signal; receiving, from the base station, a set of downlink messages; transmitting, to the base station, a set of uplink reference signals in response to receiving the set of downlink messages, wherein the set of uplink reference signals are modulated by the UE to convey the feedback information for the set of downlink messages according to the control signaling.

Aspect 2: The method of aspect 1, further comprising: applying a modulation configuration to the set of uplink reference signals, wherein conveying the feedback information is based at least in part on applying the modulation configuration.

Aspect 3: The method of aspect 2, wherein applying the modulation configuration comprises: applying one or more first cyclic shifts from a set of cyclic shifts to a first uplink reference signal of the set of uplink reference signals; and applying one or more second cyclic shifts from the set of cyclic shifts to a second uplink reference signal of the set of uplink reference signals, wherein the one or more first cyclic shifts and the one or more second cyclic shifts indicate one or more of an ACK feedback, a NACK feedback, supplemental feedback information, or a combination thereof.

Aspect 4: The method of any of aspects 2 through 3, wherein applying the modulation configuration comprises: modulating each uplink reference signal of the set of uplink reference signals by using a sequence of pilot tones from a set of sequences of pilot tones.

Aspect 5: The method of any of aspects 1 through 4, further comprising: identifying a set of antenna ports to convey the feedback information for the set of downlink messages based at least in part on the control signaling, wherein transmitting the set of uplink reference signals comprises transmitting the set of uplink reference signals on the set of antenna ports.

Aspect 6: The method of aspect 5, wherein the set of antenna ports is at least one of TDM-ed, FDM-ed, CDM-ed, or a combination thereof.

Aspect 7: The method of any of aspects 5 through 6, wherein the set of antenna ports is equal to a number of precoded downlink antenna ports.

Aspect 8: The method of any of aspects 5 through 7, wherein feedback information is repeated on at least two antenna ports from the set of antenna ports.

Aspect 9: The method of any of aspects 1 through 8, further comprising: transmitting, to the base station, a capability of the UE to support conveying of the feedback information for the set of downlink messages according to the control signaling, wherein receiving the control signaling is based at least in part on the transmitted capability.

Aspect 10: The method of any of aspects 1 through 9, further comprising: identifying a feedback delay parameter based at least in part on the control signaling, wherein transmitting the set of uplink reference signals comprises transmitting the set of uplink reference signals based at least in part on the feedback delay parameter.

Aspect 11: The method of aspect 10, wherein the feedback delay parameter is based at least in part on a frequency of conveying the feedback information or a UE capability or both.

Aspect 12: The method of any of aspects 1 through 11, further comprising: determining that a decoding procedure of a subset of the set of downlink messages is unsuccessful, wherein transmitting the set of uplink reference signals comprises transmitting a NACK feedback for the set of downlink messages based at least in part on the subset of downlink messages satisfying a threshold.

Aspect 13: The method of any of aspects 1 through 12, wherein the control signaling indicates at least one of a slot number, a frame number, a symbol number, a cell identifier, a UE identifier, or a combination thereof.

Aspect 14: The method of any of aspects 1 through 13, wherein transmitting the set of uplink reference signals comprises: transmitting the set of uplink reference signals in a full duplex mode of communication.

Aspect 15: The method of any of aspects 1 through 14, wherein the set of uplink reference signals comprises a set of SRSs.

Aspect 16: A method for wireless communication at a base station, comprising: transmitting, to a UE, control signaling indicating to the UE to convey feedback information by modulating an uplink reference signal; transmitting, to the UE, a set of downlink messages; receiving, from the UE, a set of uplink reference signals in response to receiving the set of downlink messages, wherein the set of uplink reference signals are modulated by the UE to convey the feedback information for the set of downlink messages according to the control signaling.

Aspect 17: The method of aspect 16, further comprising: identifying a modulation configuration applied to the set of uplink reference signals, wherein conveying the feedback information is based at least in part on the modulation configuration applied to the set of uplink reference signals.

Aspect 18: The method of aspect 17, wherein identifying the modulation configuration comprises: identifying one or more first cyclic shifts from a set of cyclic shifts applied to a first uplink reference signal of the set of uplink reference signals; and identifying one or more second cyclic shifts from the set of cyclic shifts applied to a second uplink reference signal of the set of uplink reference signals, wherein the one or more first cyclic shifts and the one or more second cyclic shifts indicate one or more of an ACK feedback, a NACK feedback, supplemental feedback information, or a combination thereof.

Aspect 19: The method of aspect 18, further comprising: applying a hypothesis test on the first uplink reference signal of the set of uplink reference signals and the second uplink reference signal of the set of uplink reference signals to identify one or more of the ACK feedback, the NACK feedback, the supplemental feedback information, or a combination thereof.

Aspect 20: The method of any of aspects 17 through 19, wherein identifying the modulation configuration comprises: identifying that each uplink reference signal of the set of uplink reference signals is modulated using a sequence of pilot tones from a set of sequences of pilot tones.

Aspect 21: The method of any of aspects 16 through 20, further comprising: identifying a set of antenna ports to convey the feedback information for the set of downlink messages based at least in part on the control signaling, wherein receiving the set of uplink reference signals comprises receiving the set of uplink reference signals on the set of antenna ports.

Aspect 22: The method of aspect 21, wherein the set of antenna ports is at least one of TDM-ed, FDM-ed, CDM-ed, or a combination thereof.

Aspect 23: The method of any of aspects 16 through 22, further comprising: receiving, from the UE, a capability of the UE to support conveying of the feedback information for the set of downlink messages according to the control signaling, wherein transmitting the control signaling is based at least in part on the received capability.

Aspect 24: The method of any of aspects 16 through 23, further comprising: identifying a feedback delay parameter based at least in part on the control signaling, wherein receiving the set of uplink reference signals comprises receiving the set of uplink reference signals based at least in part on the feedback delay parameter.

Aspect 25: The method of aspect 24, wherein the feedback delay parameter is based at least in part on a frequency of conveying the feedback information or a UE capability or both.

Aspect 26: An apparatus for wireless communication at a UE, comprising a processor; memory coupled with the processor; and instructions stored in the memory and executable by the processor to cause the apparatus to perform a method of any of aspects 1 through 15.

Aspect 27: An apparatus for wireless communication at a UE, comprising at least one means for performing a method of any of aspects 1 through 15.

Aspect 28: A non-transitory computer-readable medium storing code for wireless communication at a UE, the code comprising instructions executable by a processor to perform a method of any of aspects 1 through 15.

Aspect 29: An apparatus for wireless communication at a base station, comprising a processor; memory coupled with the processor; and instructions stored in the memory and executable by the processor to cause the apparatus to perform a method of any of aspects 16 through 25.

Aspect 30: An apparatus for wireless communication at a base station, comprising at least one means for performing a method of any of aspects 16 through 25.

Aspect 31: A non-transitory computer-readable medium storing code for wireless communication at a base station, the code comprising instructions executable by a processor to perform a method of any of aspects 16 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    receiving, from a network entity, control signaling indicating to the UE to convey feedback information by modulating an uplink reference signal;
    receiving, from the network entity, a set of downlink messages comprising a first set of code blocks and a second set of code blocks;
    modulating, in accordance with a set of cyclic shifts, a set of uplink reference signals comprising a first uplink reference signal and a second uplink reference signal, wherein applying a first cyclic shift to a sequence indicates a first combination of feedback information for the first set of code blocks and applying a second cyclic shift to the sequence indicates a second combination of feedback information for the second set of code blocks; and
    transmitting, to the network entity, the set of uplink reference signals in response to receiving the set of downlink messages, wherein the set of uplink reference signals are modulated by the UE to convey the feedback information for the set of downlink messages according to the set of cyclic shifts.

2. The method of claim 1, further comprising:
    applying a modulation configuration to the set of uplink reference signals, wherein conveying the feedback information is based at least in part on applying the modulation configuration.

3. The method of claim 2, wherein
    the first cyclic shift and the second cyclic shift indicate one or more of an acknowledgement feedback, a negative acknowledgement feedback, supplemental feedback information, or a combination thereof.

4. The method of claim 2, wherein applying the modulation configuration comprises:
    modulating each uplink reference signal of the set of uplink reference signals by using a sequence of pilot tones from a set of sequences of pilot tones.

5. The method of claim 1, further comprising:
identifying a set of antenna ports to convey the feedback information for the set of downlink messages based at least in part on the control signaling, wherein transmitting the set of uplink reference signals comprises transmitting the set of uplink reference signals on the set of antenna ports.

6. The method of claim 5, wherein the set of antenna ports is at least one of time division multiplexed, frequency division multiplexed, code division multiplexed, or a combination thereof.

7. The method of claim 5, wherein the set of antenna ports is equal to a number of precoded downlink antenna ports.

8. The method of claim 5, wherein the feedback information is repeated on at least two antenna ports from the set of antenna ports.

9. The method of claim 1, further comprising:
transmitting, to the network entity, a capability of the UE to support conveying of the feedback information for the set of downlink messages according to the control signaling, wherein receiving the control signaling is based at least in part on the transmitted capability.

10. The method of claim 1, further comprising:
identifying a feedback delay parameter based at least in part on the control signaling, wherein transmitting the set of uplink reference signals comprises transmitting the set of uplink reference signals based at least in part on the feedback delay parameter.

11. The method of claim 10, wherein the feedback delay parameter is based at least in part on a frequency of conveying the feedback information or a UE capability or both.

12. The method of claim 1, further comprising:
determining that a decoding procedure of a subset of the set of downlink messages is unsuccessful, wherein transmitting the set of uplink reference signals comprises transmitting a negative acknowledgement feedback for the set of downlink messages based at least in part on the subset of the set of downlink messages satisfying a threshold.

13. The method of claim 1, wherein the control signaling indicates at least one of a slot number, a frame number, a symbol number, a cell identifier, a UE identifier, or a combination thereof.

14. The method of claim 1, wherein transmitting the set of uplink reference signals comprises:
transmitting the set of uplink reference signals in a full duplex mode of communication.

15. The method of claim 1, wherein the set of uplink reference signals comprises a set of sounding reference signals.

16. A method for wireless communication at a network entity, comprising:
transmitting, to a user equipment (UE), control signaling indicating to the UE to convey feedback information by modulating an uplink reference signal;
transmitting, to the UE, a set of downlink messages comprising a first set of code blocks and a second set of code blocks; and
receiving, from the UE and in response to receiving the set of downlink messages, a set of uplink reference signals comprising a first uplink reference signal and a second uplink reference signal, wherein the set of uplink reference signals are modulated by the UE to convey the feedback information for the set of downlink messages according to a set of cyclic shifts, and wherein a first cyclic shift applied to a sequence indicates a first combination of feedback information for the first set of code blocks and a second cyclic shift applied to the sequence indicates a second combination of feedback information for the second set of code blocks.

17. The method of claim 16, further comprising:
identifying a modulation configuration applied to the set of uplink reference signals, wherein conveying the feedback information is based at least in part on the modulation configuration applied to the set of uplink reference signals.

18. The method of claim 17, wherein identifying the modulation configuration comprises:
identifying the first cyclic shift from the set of cyclic shifts applied to the first uplink reference signal of the set of uplink reference signals; and
identifying the second cyclic shift from the set of cyclic shifts applied to the second uplink reference signal of the set of uplink reference signals, wherein the first cyclic shift and the second cyclic shift indicate one or more of an acknowledgement feedback, a negative acknowledgement feedback, supplemental feedback information, or a combination thereof.

19. The method of claim 18, further comprising:
applying a hypothesis test on the first uplink reference signal of the set of uplink reference signals and the second uplink reference signal of the set of uplink reference signals to identify one or more of the acknowledgement feedback, the negative acknowledgement feedback, the supplemental feedback information, or a combination thereof.

20. The method of claim 17, wherein identifying the modulation configuration comprises:
identifying that each uplink reference signal of the set of uplink reference signals is modulated using a sequence of pilot tones from a set of sequences of pilot tones.

21. The method of claim 16, further comprising:
identifying a set of antenna ports to convey the feedback information for the set of downlink messages based at least in part on the control signaling, wherein receiving the set of uplink reference signals comprises receiving the set of uplink reference signals on the set of antenna ports.

22. The method of claim 21, wherein the set of antenna ports is at least one of time division multiplexed, frequency division multiplexed, code division multiplexed, or a combination thereof.

23. The method of claim 16, further comprising:
receiving, from the UE, a capability of the UE to support conveying of the feedback information for the set of downlink messages according to the control signaling, wherein transmitting the control signaling is based at least in part on the received capability.

24. The method of claim 16, further comprising:
identifying a feedback delay parameter based at least in part on the control signaling, wherein receiving the set of uplink reference signals comprises receiving the set of uplink reference signals based at least in part on the feedback delay parameter.

25. The method of claim 24, wherein the feedback delay parameter is based at least in part on a frequency of conveying the feedback information or a UE capability or both.

26. An apparatus for wireless communication at a user equipment (UE), comprising:
a processor;
memory coupled with the processor; and instructions stored in the memory and executable by the processor to cause the apparatus to:

receive, from a network entity, control signaling indicating to the UE to convey feedback information by modulating an uplink reference signal;

receive, from the network entity, a set of downlink messages comprising a first set of code blocks and a second set of code blocks;

modulate, in accordance with a set of cyclic shifts, a set of uplink reference signals comprising a first uplink reference signal and a second uplink reference signal, wherein applying a first cyclic shift to a sequence indicates a first combination of feedback information for the first set of code blocks and applying a second cyclic shift to the sequence indicates a second combination of feedback information for the second set of code blocks; and transmit, to the network entity, the set of uplink reference signals in response to receiving the set of downlink messages, wherein the set of uplink reference signals are modulated by the UE to convey the feedback information for the set of downlink messages according to the set of cyclic shifts.

27. The apparatus of claim 26, wherein the instructions are further executable by the processor to cause the apparatus to:

apply a modulation configuration to the set of uplink reference signals, wherein conveying the feedback information is based at least in part on applying the modulation configuration.

28. The apparatus of claim 27, the first cyclic shift and the second cyclic shift indicate one or more of an acknowledgement feedback, a negative acknowledgement feedback, supplemental feedback information, or a combination thereof.

29. An apparatus for wireless communication at a network entity, comprising:

a processor;

memory coupled with the processor; and instructions stored in the memory and executable by the processor to cause the apparatus to:

transmit, to a user equipment (UE), control signaling indicating to the UE to convey feedback information by modulating an uplink reference signal;

transmit, to the UE, a set of downlink messages comprising a first set of code blocks and a second set of code blocks; and receive, from the UE and in response to receiving the set of downlink messages, a set of uplink reference signals comprising a first uplink reference signal and a second uplink reference signal, wherein the set of uplink reference signals are modulated by the UE to convey the feedback information for the set of downlink messages according to a set of cyclic shifts, and wherein a first cyclic shift applied to a sequence indicates a first combination of feedback information for the first set of code blocks and a second cyclic shift applied to the sequence indicates a second combination of feedback information for the second set of code blocks.

30. The apparatus of claim 29, wherein the instructions are further executable by the processor to cause the apparatus to:

identify a modulation configuration applied to the set of uplink reference signals, wherein conveying the feedback information is based at least in part on the modulation configuration applied to the set of uplink reference signals.

* * * * *